United States Patent [19]
Johansson

[11] Patent Number: 6,061,330
[45] Date of Patent: May 9, 2000

[54] FLOW AND CONGESTION CONTROL IN PACKET SWITCHED NETWORKS

[75] Inventor: Per Gunnar Johansson, Hägersten, Sweden

[73] Assignee: Telefoanktiebolaget LM Ericsson, Stockholm, Sweden

[21] Appl. No.: 09/153,738

[22] Filed: Sep. 15, 1998

Related U.S. Application Data

[63] Continuation of application No. PCT/SE97/00439, Mar. 14, 1997.

[30] Foreign Application Priority Data

Mar. 15, 1996 [SE] Sweden ................................. 9601000

[51] Int. Cl.⁷ .................................................. G01R 31/08
[52] U.S. Cl. ............................................ 370/229; 370/230
[58] Field of Search ..................................... 370/235, 236, 370/231, 230, 232, 233, 234, 252, 253; 395/200.63, 203.65

[56] References Cited

U.S. PATENT DOCUMENTS

| | | | |
|---|---|---|---|
| 5,319,638 | 6/1994 | Lin ............................................. | 370/60 |
| 5,457,687 | 10/1995 | Newman ................................. | 370/85.3 |
| 5,493,566 | 2/1996 | Ljungberg et al. ........................ | 370/60 |
| 5,793,747 | 9/1998 | Kline ....................................... | 370/230 |

OTHER PUBLICATIONS

Per Johansson et al., Transient Analysis of a Closed Loop Rate Control Algorithm for ATM, Aug. 22, 1995, pp. 33–46.

Hiroyuki Ohsaki et al., Analysis of Rate–Based Congestion Control Algorithms for ATM Networks, May 1995, pp. 296–303.

Barnhart, A.W., "Example Switch Algorithm for Section 5.4 of TM Spec.", Hughes Network Systems, ATM Forum Contribution 95–0195, Feb. 1995.

Jain, Raj et al., "ERICA+ Extension to the ERICA Switch Algorithm", Ohio State University, ATM Forum Contribution 95–0195, Oct. 1995.

*Primary Examiner*—Michael Horabik
*Assistant Examiner*—Prenell Jones
*Attorney, Agent, or Firm*—Burns, Doane, Swecker & Mathis, L.L.P.

[57] ABSTRACT

A control system in an ATM system controls flows of data cells and flow control management cells from a number of sources to a destination over connections passing a network element. The flow control management cells are returned from the destination via the network element to their respective sources. The network element is exposed to congestion due to contention between the connections, that necessitates queuing of the connections. The flow control management cells have an explicit rate field for an explicit rate value used to limit a source maximum allowed cell rate to a specific value. An operating function uses deviations from an available rate value for lower priority cells and from a queue length reference forming a desirable queue length, to calculate a modified explicit rate value as a function of these deviations. This modified explicit rate value is introduced into the explicit rate field of the backward flow control management cells.

24 Claims, 8 Drawing Sheets

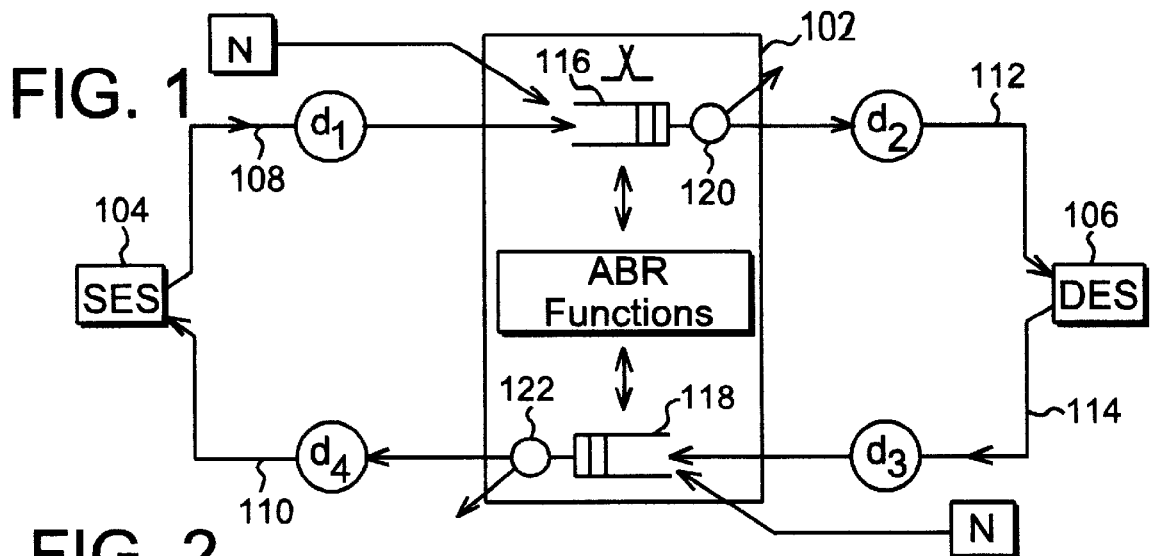
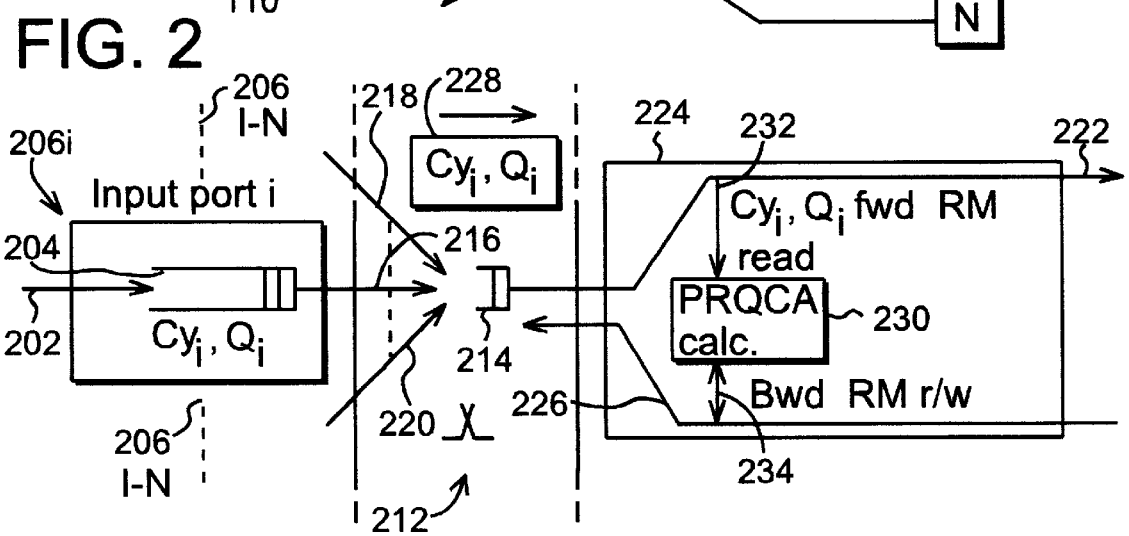
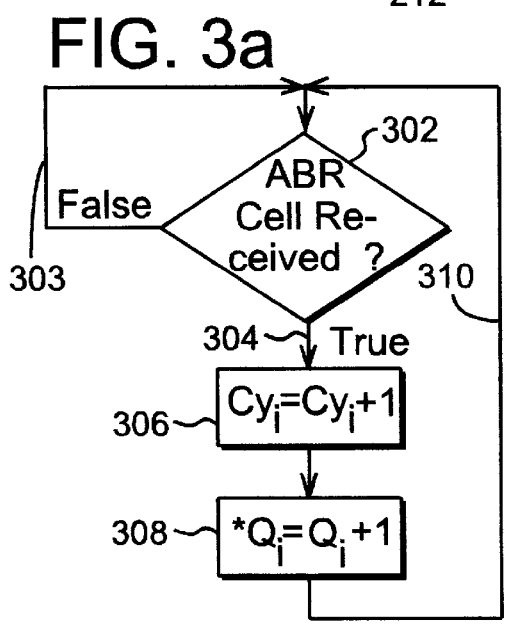
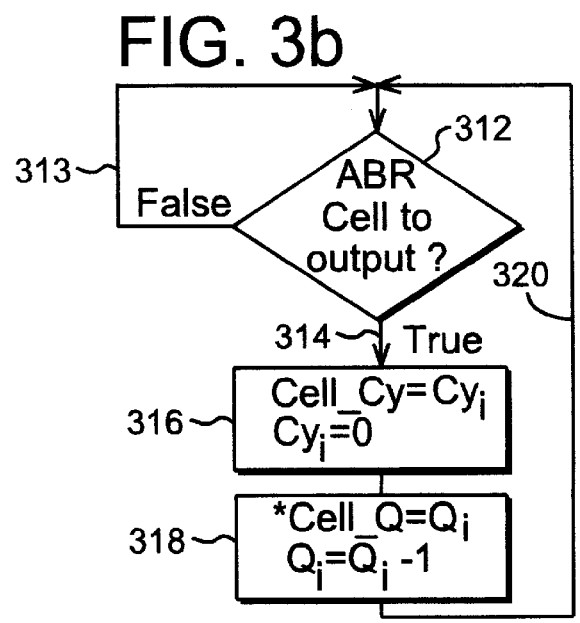

FLOW AND CONGESTION CONTROL IN PACKET SWITCHED NETWORKS

This application is a continuation of International Application No. PCT/SE97/00439 filed on Mar. 14, 1997, which designates the United States.

This application is a continuation of International Application No. PCT/SE97/00439, which was filed on Mar. 14, 1997, which designated the United States, and which is expressly incorporated here by reference.

BACKGROUND

The present invention to a first aspect relates to a method and a system in an ATM system for controlling flows of data cells and flow control management cells from a number of sources to a destination over connections passing a network element, while returning the flow control management cells from the destination via the network element to the respective sources. The network element may be exposed to congestion due to contention between the connections, which necessitates queuing of the connections. The data cells include lower priority cells and higher priority cells. The flow control management cells have an explicit rate field for an explicit rate value used to limit a source maximum allowed cell rate to a specific value, and a current cell rate field for receiving said specific value.

According to a second aspect the invention relates to a method and a system in an ATM system for controlling flows of data cells and flow control management cells from a number of sources to a destination over connections passing a respective input buffer and a common output buffer of a fair queuing switch, while returning the flow control management cells from the destination via the switch to the respective sources. The switch is exposed to congestion due to contention between the connections, that necessitates queuing of the connections in the input buffers and output buffer. The flow control management cells have an explicit rate field for an explicit rate value used to limit a source maximum allowed cell rate to a specific value, and a current cell rate field for receiving said specific value.

The use of ATM as a new and overall solution for data communication, spanning from the local area to the wide area has proven to be burdened with a significant amount of problems. Most of these problems are more or less inherently connected to the properties of the data communication traffic as such, which to a great extent differ from characteristics well known from the telecommunications domain.

In general, applications using data communication services require large amount of bandwidth during rather short periods of time, causing offered traffic with bursty characteristics. Moreover, the information sent between typical computer applications must be error free, but may be affected by some transfer delay without deteriorated performance. Applications within the telecommunications domain could be said to have the opposite characteristics, i.e. the bandwidth is kept constant and they are not too sensitive to bit errors but sensitive to delays and variation of delays.

Consequently, data communication traffic must be managed differently from the telecommunication traffic within the ATM networks if the trade-off between network utilization and quality of service (QoS) is to be kept at an acceptable balance.

Recent efforts within standardization for a reflect the need for a specific ATM service to handle traffic with "pure" data communication properties. A service called the Available Bit Rate ABR service is specified in ATM Forum Traffic Management Specification 4.0, ATMF 95-0013R10, Feb. 1996. This service will be included in the ITU-T recommendations, as well, cf. e.g. ITU-T Recommendation I.371, "Congestion Management for the B-ISDN", 1995.

The ABR service utilizes a rate based congestion control concept. The network controls the rate at which the users mate transmit data by means of feedback information sent to the sources.

SUMMARY

A number of different explicit rate control algorithms have been proposed within the framework of the ABR service development. The complexity of these algorithms to a great extent depends on the choice of buffer scheduling principles in the switch. In order to limit the complexity, most of the algorithms so far have aimed at switches using FIFO scheduling. However, some of these algorithms use what could be called a "per VC accounting" to, for instance, keep track of the number of active connections in a switch and/or the number of stored cells per VC.

In most of the algorithms a buffer threshold is utilized in one way or the other to determine whether a switch is congested or not. The actions taken during congestion differ often quite drastically from those taken during non congested conditions in order to alleviate the congestion condition. In some a bit more sophisticated algorithms the total input rate is compared to a desired rate reference, or workload, and a change in the input rate is ordered in proportion to the difference, cf. for example A. W. Barnhart, Hughes Network Systems, ATM Forum Contribution 95-0195, February 1995, "Example Switch Algorithm for Section 5.4 of TM Spec.". Simulations of the algorithm proposed in this document have indicated that when small values of a gain parameter is used, the algorithm has difficulties finding the accurate rate (fair rate) fast enough to efficiently use the unused bandwidth. When the gain parameter is given a higher value, the rate instead tends to oscillate and by that causes an unstable situation in the network. Another similar algorithm has been proposed by Raj Jain et. al., Ohio State University, ATM Forum Contribution 95-0195, October 1995, "ERTCA+: Extensions to the ERICA Switch Algorithm".

It is an object of the present invention to provide an explicit rate mechanism that combines both information about the buffer occupancy and the input rate offered to a switch, and which can be used in a switch using an "ordinary" FIFO scheme as well as in a fair queuing scheduler.

This object has been attained by the method and the system according to the first and second aspects having attained the features appearing from claims 1–22 and 23–34 respectively.

In one important embodiment of the first aspect values of a set of parameters and variables are obtained, which include:

$y(t)$: a contention rate at the output buffer at time t, $y_{tot}(t)$: a measured offered rate to the output buffer at time t, $C(t)$: available rate at the buffer for lower priority cells at time t, $Q(t)$: total queue length at the buffer at time t, p: fraction of an available rate at the buffer strived to, M: a buffer queue length reference, $a_i$ and $b_i$: proportional constants for a connection i passing the output buffer.

Based upon these values the explicit rate value $x_i(t)$ at time t for the connection i is calculated as $$x_i t = y(t)\left[1 - a_i\left\{1 - \frac{pC(t)}{y_{tot}(t)}\right\} - b_i\left\{\frac{O(t) - M}{y_{tot}(t)}\right\}\right]$$

The explicit rate value $x_i t$ thus calculated is assigned to the explicit rate field of a backward flow control management, cell.

In one important embodiment of the second aspect values of a set of parameters and variables are obtained, which include:

$r_j(t)$: output rate at time (t) at the input buffer for connection j, p(t): total load at time (t) on output from the input buffer calculated as the quotient number of APR cells received at the input buffer per time unit/number of occasions to send an ABR cell per time unit, pref: desired load on output from the input buffer, $Q_j(t)$
: queue length at time (t) at the input buffer for connection j, $M_j$: queue length reference at the input buffer for connection j.

a and b: proportional constants for connection j,

Based upon these values the explicit rate value $x_j(t)$ at time t for the connection j is established as $$x_j(t) = \max(r_j(t))\left[1 - a\left\{1 - \frac{pref}{p(t)}\right\} - b\left\{\frac{Q_j(t) - M_j}{\max(r_j(t))}\right\}\right]$$

wherein $\max(r_j(t))$ is an operation performed on the individual connection output rates rj(t) of the switch in order to find a common output rate for the connections passing the common output buffer and thus avoid a divergence in the individual connection rates. The explicit rate value $x_j t$ is assigned to the explicit rate field of a backward resource management cell passing the input buffer j.

By the invention the "lap time" on the control loop is shortened by catching information about the switch on the way back to the source. This state occurs after sending has first started with a delay caused by a full loop source-switch-destination.

BRIEF DESCRIPTION OF THE DRAWINGS

The invention will now be described more closely below with reference to the drawings on which FIG. 1 is a schematic view of an ABR-connection extending in both directions between a source end system and a destination end system via a switch, FIG. 2 is a view showing in more detail a part of the connection according to FIG. 1 extending between an input port and an output port of the switch, said input port and output port including an input device and an output device, respectively, FIGS. 3a–b and 4a–d are flow diagrams illustrating operational steps performed in the input device and the output device illustrated in FIG. 2, FIGS. 5 and 6 are block diagrams illustrating in more detail the structure of the input device and output device of FIG. 2, respectively.

DETAILED DESCRIPTION

Figure 4B:
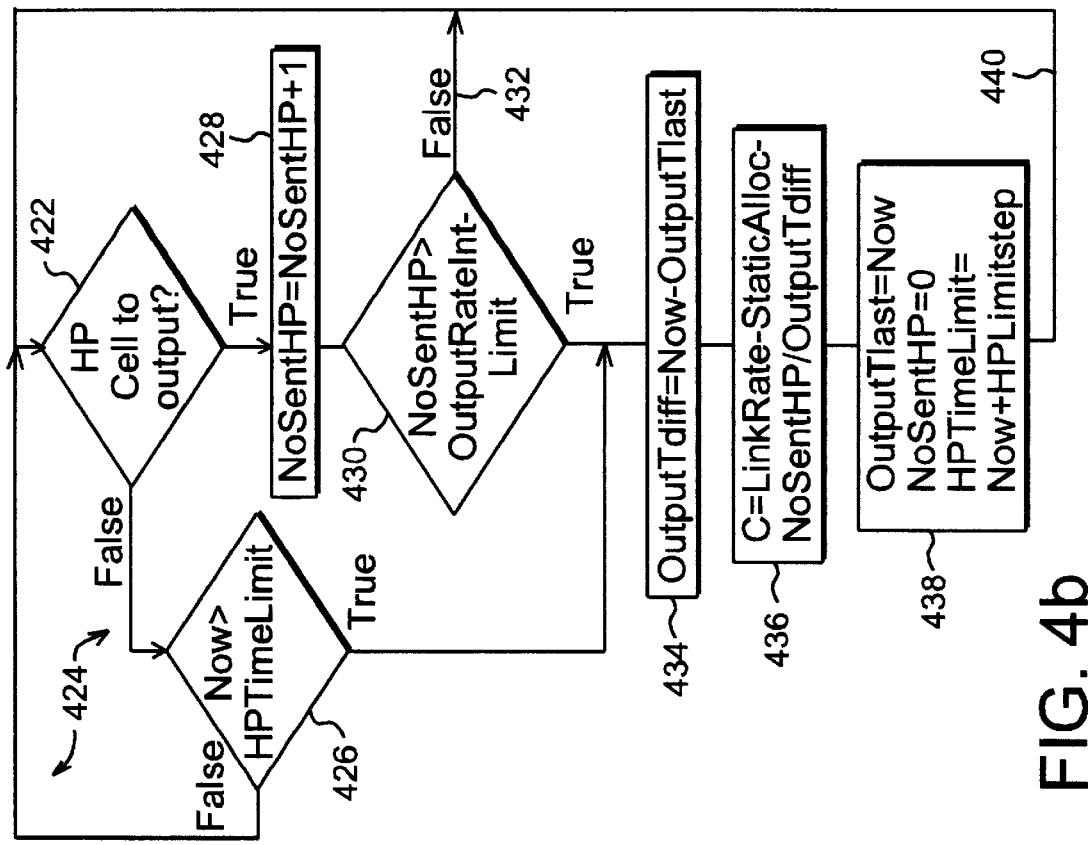

FIG. 1 is a schematic view of an examplary connection in which the present invention may be used. More particularly, it is the question of an ABR end-to-end connection (ABR: Available Bit Rate) passing through a number of network elements, e.g. a number of switches, of which one is schematically indicated at 102, in an ATM network. The switch 102 is the bottleneck along the connection and is assumed to be output buffered or logically having one common buffer per output port. According to the ATM Forum reference mentioned earlier, ABR is an ATM layer service category for which the limiting ATM layer transfer characteristics provided by a network may change subsequent to connection establishment. The service includes a flow control mechanism which supports feedback to control the cell transfer rate of the source rate in response to changing ATM transfer characteristics. Cell transfer rate in different locations along a connection such as the one forming an example here as usually expressed as cells/ms or Mbps and will be referred to below Just as rate. The feedback is conveyed to the source through specific control cells called Resource Management cells, or RM-cells. More particularly, in FIG. 1 ABR flow control occurs between a sending source end system 104, below referred to as source, and a receiving destination end system 106, below referred to as destination, representing a respective line termination and being interconnected via bi-directional connections. Per se, for a bi-directional ABR connection each connection termination point is both a source and a destination. However, for the sake of simplicity only the information flow from the source 104 to the destination 106 with its associated RM-cell flows will be considered here. Thus, by forward direction will here be meant the direction from the source 102 to the destination 104, and the backward direction will be the direction from the destination 104 to the source 102.

In FIG. 1 the source end system 104 is shown to be bi-directionally connected to a switch port, not shown, of the switch 102. The bi-directional connection is represented by links 108 and 110 for the forward and backward direction, respectively. The links 108 and 110 are exposed to propagation delay represented by $d_1$ and $d_4$ within circles, respectively. The destination end system 106 is bi-directionally connected to the same switch port of the switch 102. The bi-directional connection is represented by links 112 and 114 for the forward and backward direction, respectively. The links 112 and 114 are exposed to propagation delay represented by $d_2$ and $d_3$ within circles, respectively. At 116 and 118 output buffers ending in the links 112 and 110, respectively, are indicated. Boxes denoted N represent other connections that use the same output buffer, i.e. the output buffers 116 and 118 are exposed to an aggregated cell flow from all active connections that can cause congestion at the buffers, this in turn causing a contention situation to occur between the connections in question. Transmission delay caused thereby from the buffers 116 and 118 is indicated by symbols 120 and 122. By congestion is here meant the same as defined in B-ISDN, viz. a state of network elements (e.g. switches, concentrators, cross-connects and transmission links) in which a network is not able to meet negotiated network performance objectives for already established connections and/or for new connection requests. In general, congestion can be caused by unpredictable statistical fluctuations of traffic flows and fault conditions within the network.

For the forward information flow from the source 104 to the destination 106 in FIG. 1, there is a control loop consisting of two RM cell flows, one in the forward direction and one in the backward. The source 102 generates forward RM cells which are turned around by the destination 104 and sent back to the source as backward RM cells. These backward RM cells carry feedback information provided by the network elements and/or the destination back to the source. As stated in the ATM forum reference a network element may:

Directly insert feedback control information into RM cells when they pass in the forward or backward direction.

Indirectly inform the source about congestion by setting an explicit forward congestion indication bit in the data cell header of the cells of the forward information flow. In this case, the destination will update the backward RM cells based on this congestion information.

Generate backward RM cells.

A box 124 in FIG. 1 represents various ABR related functions such as measurements at the buffers 116 and 118 of buffer queue length and/or offered rate, as well as RM cell read and write operations. The switch 102 may also insert backward RM cells to reduce feedback delays.

Feedback information from the switch 102 to the source 104 is conveyed in the backward RM cells at a rate proportional to the output rate. If an explicit rate scheme is used, the bottleneck rate for a connection is given by the minimum or explicit rates calculated in each switch or in the destination end system 106. The explicit rate will here be referred to as ER.

The ER is given in an ER field of the RM cell and used to limit a source maximum allowed cell rate, denominated ACR, to a specific value. A field in the forward RM cell, denominated Current Cell Rate (CCR) is assigned the ACR at the source when sending away a forward RM cell. The ER is initially set by the source to a requested rate and may be subsequently reduced by any network element in the path to a value that the element can sustain.

Based on the description above with reference to FIG. 1, the invention will now be elucidated by the use of an algorithm. The target system for the algorithm may be a network element, e.g. in the form of a physically or logically output buffered switch, such as the switch 102 in FIG. 1 with its output buffers 116 and 118.

In order to shorten the feedback delay, the RM cells are assigned information in the reverse direction through the switch, which means that connections with the same delay in a loop including only source and switch, rather than in a loop including also the destination, will have the same control loop delay. The width of delay values within a group will be determined by the required tolerance of stability, on the one hand, and limitations due to implementation aspects, on the other hand. The algorithm uses two proportional constants, denoted $a_i$ and $b_i$, respectively, for each group, correspondingly denoted $G_i$, of connections that have similar propagation delay $d=d_1+d_4$. The accuracy on how connections in practice are partitioned into groups is relaxed and delays within a group are assumed identical. The constants $a_i$ and $b_i$ are used as proportional constants for the measured error in rate and queue length, respectively. Rules to set these constants will be discussed further below. Optionally, all connections could be put in one and the same group of connections, which avoids a search for the appropriate pair of constants when a backward RM cell shall be given an ER value.

In the algorithm shown below, the explicit rate at time t for the group $G_i$ is denoted $x_i(t)$ and calculated at the switch by the following formula:

$$x_i t = y(t)\left[1 - a_i\left\{1 - \frac{pC(t)}{y_{tot}(t)}\right\} - b_i\left\{\frac{Q(t) - M}{y_{tot}(t)}\right\}\right] \quad (1)$$

and assigned to the ER field of the RM cell, unless a lower ER value already was assigned. The algorithm uses the following variables:

y(t):measured individual rate of contending connections at time t, also called contention rate henceforth, $y_{tot}(t)$:measured offered rate to the buffer at time t, C(t):bandwidth capacity available at time t, also called available rate henceforth, Q(t):the buffer occupancy at time t, also called queue length henceforth, p:fraction of the available bandwidth that the algorithm tries to allocate, M:a queue length reference.

As discussed above, the CCR field in the forward RM cell is assigned the maximum allowed cell rate ACR at the source when a forward RM cell was sent away. The CCR is used to calculate the contention rate y(t) at the buffer and is referred to below as the fair share rate. The calculations are performed by means of an exponential averaging of the value in the CCR fields, i.e.

$$(2) y(t) = \alpha CCR_{con} + (1-\alpha)y(t), (2)$$

wherein

α is an exponential averaging constant (in the interval [0,1]), $CCR_{con}$ denotes those CCRs encountered with a value equal or higher than $\beta y(t)$, where $\beta$ is a fraction of the fair share rate that a CCR must exceed to be part of average.

This condition assures that only connections that actually have their bottleneck at the switch buffer in question, or at least have a rate close to the fair share rate, are taken into account and thereby avoids underflow of the buffer. The exponential averaging function (2) is commonly used in other FIFO based explicit rate ABR algorithms to derive a measure of the fair share rate and is then often denoted MACR calculation, cf. A. W. Barnhart, Hughes Network Systems, ATM Forum Contribution 95-0195, February 1995, "Example Switch Algorithm for Section 5.4 of TM Spec." In the algorithm proposed here the averaging is slightly modified to avoid starvation of updates if large immediate changes to the input rates occur. A counter counts the number of received underflowing CCR values and keeps the count. If the count exceeds a limit, the CCR value will be used anyway. Every reception of a CCR value from a contending connection will reset the counter.

The measurements of the offered rate $y_{tot}(t)$ and the available rate C(t) are performed by taking ratios of cell counts and time intervals, defined by a minimum number of cells. C(t) is derived by taking the difference between the total link rate and bandwidth allocated by traffic with higher priority, i.e. variable bit rate VBR and continuous bit rate CBR. In the VBR case this should be done within a relatively short time frame, while the CBR allocation only changes as connections are set up or released.

As stated above the algorithm is operating at the point in the switch where ABR connections are contending for the output link capacity, e.g. at an output buffer. However, for implementation reasons it may be difficult to locate sufficient buffering capacity at the output port. Instead, the buffers are located at the input side and in such a case the invention operates on a logical output buffer and use measures extracted from the distributed buffering structure.

Further below a case of location of the algorithm will be described. This location should be regarded as optional and alternative locations are fully possible with respect to the algorithm as such, but, however, limited for implementation reasons.

Even though the purpose of ABER is to utilize unused bandwidth, some bandwidth will be reserved static, e.g. for CBR traffic only, and must not be allocated by ABR. In a pseudo code to be described still further below, the static allocated bandwidth is always subtracted from the link rate.

A typical switch solution with distributed buffering has, as mentioned above, large input buffers at the input ports and relatively small buffers at the output ports. Cell losses in the small output buffer are avoided by means of an internal flow control mechanism, which does not form part of the invention. Furthermore, to avoid head of line blocking, the input buffers should be logically divided into separate buffers for each output port. The distribution of buffering means that the actual offered rate and queue will be spread between the input buffers, but the algorithm must operate with the total rate and queue length in order to cope with the fairness objectives. A way to attain this, schematically illustrated in FIG. 2, is to let a switch internal cell format convey counts of arrived cells and measures or queue lengths from each logical input buffer to an output port, where the actual explicit rate calculation and backward RM cell assignment takes place.

FIG. 2 is a view showing in more detail a part of the connection according to FIG. 1 extending between an input port and an output port of the switch. In FIG. 2 an arrow 202 indicates cells arriving from the source, at a logical input buffer 204 of an input device $206_i$. The input device $206_i$ is a member of a number of input devices $206_{1-N}$ belonging to the switch, here indicated at 212. All of these input devices include logical input buffers, such as the buffer 204. At each input device the total number of arriving cells and the number of queuing cells are counted to produce an arriving cell count $Cy_i$ and a queuing cell count $Q_i$, respectively. Cells leaving the buffer 204 and entering an output buffer 214 in an output port, not shown, of the switch 212 are indicated by an arrow 216. The output port including the buffer 214 is a member of N output ports belonging to the switch 212. Arrows 218 and 220 indicate cell flows from the logical buffers of the other ones of the input devices $206_{1-N}$ also entering the same switch output buffer 214. Cells leaving the buffer 214 and the switch 212 are sent in the forward direction, indicated by an arrow 222, via an output device 224 to a destination, not shown. The output device 224 is in common to the N output ports. Cells returned by the destination in the backward direction to the switch 212 via the output device 224 are indicated by an arrow 226.

The input cell count and queue measurements, such as $Q_i$ and $Cy_i$ from the input device $206_i$, are conveyed from each logical input buffer to the output device 224 in two fields of an internal cell format indicated at 228. At the output device 224 the actual explicit rate calculation and backward RM cell assignment takes place in a function indicated by a block 230, and a record of the total of arrived cell counts and queue length values for each of the input devices $206_{1-N}$ must be maintained there. An arrow 232 pointing to the block 228 indicates the transfer of the $Cy_i$ and $Q_i$ values as well as read operation on forward RM cells. The delay caused by the output buffer 214 before the counts reach the output device 224 will be short compared to the overall propagation delay. The total offered rate will be calculated in continuous intervals and the instantaneous total queue length is simply the sum of the queue lengths conveyed from the input ports. When a backward RM cell is forwarded, the total queue value and the latest rate value is used to calculate the explicit rate value. A double arrow 234 between the arrow 226 and the block 228 indicates read and write operations on a backward RM cell.

Figure 5:
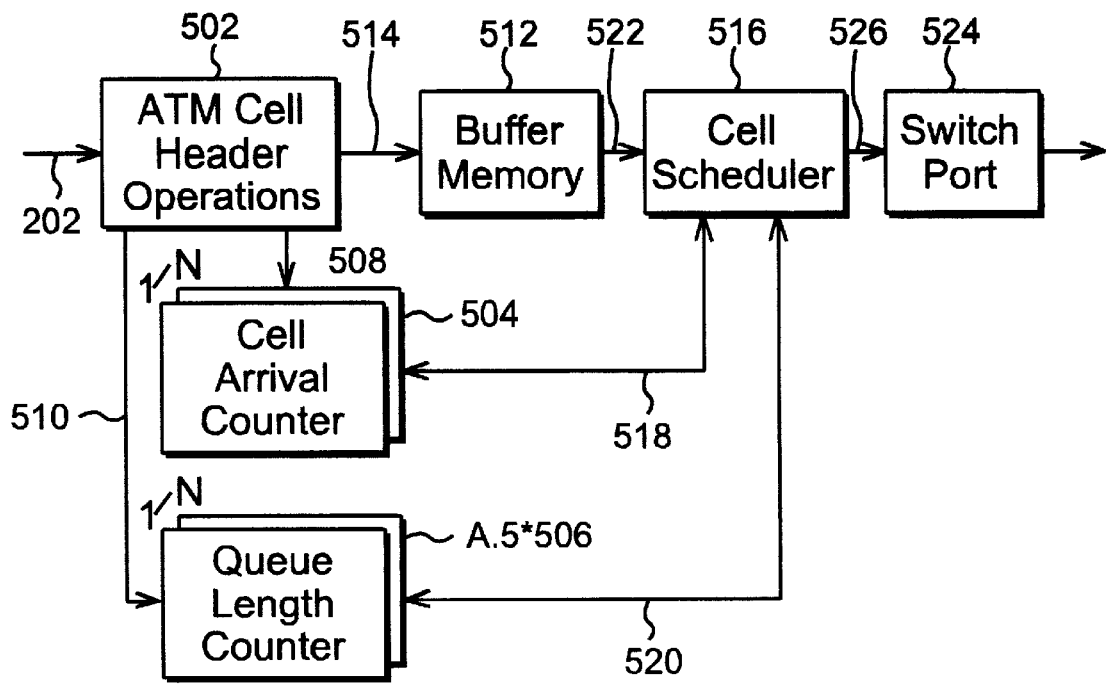
Figure 6:
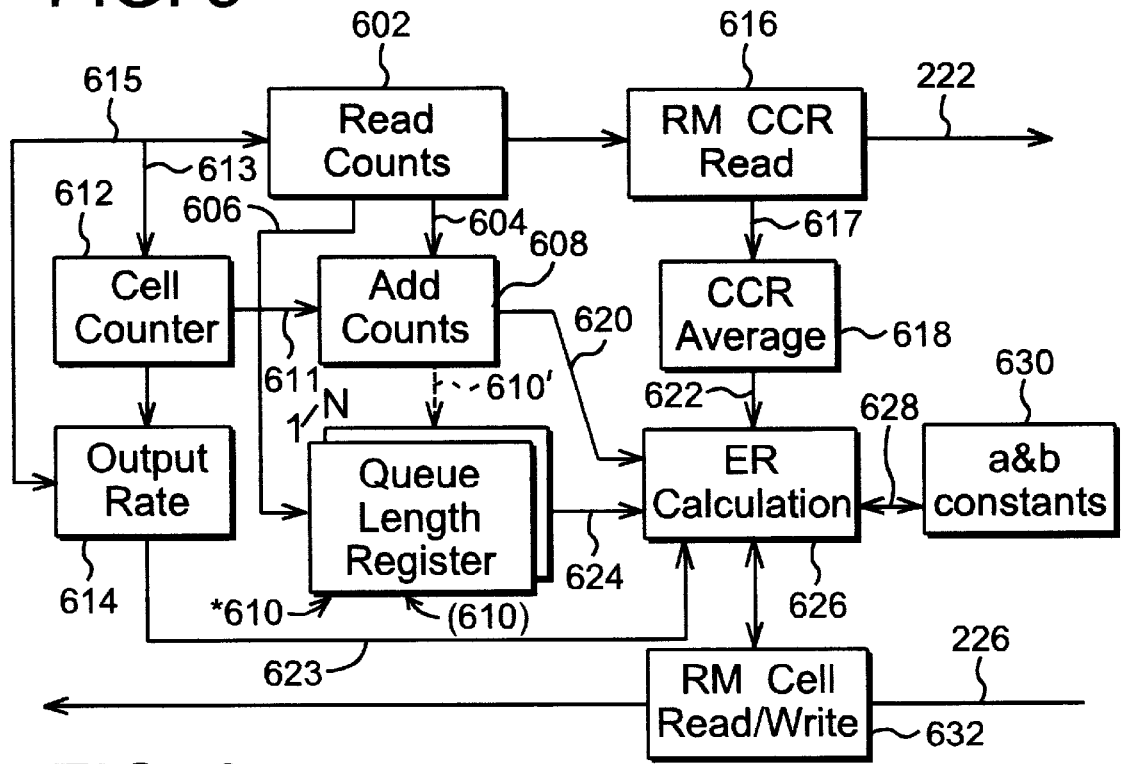

A similar method to convey cell counts and queue length measurements as the one described above with reference to FIG. 2 may be used when large buffers are located at the output port. However no aggregation of the measurements from different input ports is necessary in this case. Instead the conveyed values may be used directly in the ER calculation. The operations performed in FIG. 2 will now be described below with reference to FIGS. 3–6. FIGS. 3 and 4 contain flow diagrams illustrating operational steps performed in the in-put device 206 and output device 224, respectively, and represented in pseudo code blocks following below. Arrivals of data or RM cells will be the events that clock the operations through different sequences. The description with reference to FIGS. 5 and 6, showing parts of the structure of FIG. 2 in more detail, will further elucidate the performance of the operations.

The following variables and parameters will be used in the flow diagrams and the pseudo code:

NoRec :Total Count of received cells.

NoSentHP:Count of the number of higher priority cells sent with variable bit rate (VBR).

HPlimitstep:The maximum interval length for the output link rate calculation.

InputRateLimitstep:The maximum interval length for the input rate calculation.

StaticAlloc:Value of static allocated bandwidth for CBR traffic. It is provided by the signalling application or the management system for the network.

InputRateintLimit:Number of cells necessary for offered raze calculation.

OutputRateIntLimit:Number of cells necessary for output rate calculation.

Q:Vector of queue values for each logical input buffer.

Qtot:The total of the elements in Q.

Rho:Load Factor used for enabling control of the system towards a load between 0 and 1 in steady state.

β:Fraction of the fair share that a CCR must exceed to be part of average.

α:Exponential averaging constant (in the interval [0,1]).

a:Vector of rate proportional factors for each group of connections with similar propagation delay.

b:Vector of queue proportional factors for each group of connections with similar propagation delay.

The flow diagram in FIGS. 3a and 3b shows operational steps performed on ABR cells in the input device $206_i$. FIG. 3a deals with ABR cell arrivals to the input device. Waiting for arrival of ABR cells is represented by block 302 and continue wait state arrow 303. If an ASR cell is received, indicated by arrow 304, cell count and queue length count steps 306 and 308, respectively, follow. The respective counts are indicated by $Cy_i$ and $Q_i$ in FIG. 3a. In the block indicating step 308 and on the corresponding line of the pseudo code (c1) below an asterisk indicates that this step is not used if an alternative queue length calculation is used, that will be described later. Step 308, or step 306 in the alternative case, is followed by return to the wait state according to arrow 310.

Code block (c1) below includes the state and operations shown in blocks 302, 306 and 308.

If Cell received
   (c1)Çyi:=Cyi+1
      Qi:=Qi+1
EndIf

Steps preparing for transmission of ABR cells to the output device 224 are shown in FIG. 3b. Waiting for transmission of ABR cells to the output device 224 is represented by block 312 and continue wait state arrow 313. If an ABR cell shall be transmitted, indicated by arrow 314, steps 316 and 318 follow. In these steps the values resulting from the operations of FIG. 3a are introduced into the respective two fields of the internal cell format indicated at 228 in FIG. 2, followed by setting to 0 of $Cy_i$, step 316, and reducing the $Q_i$ count by 1, step 318. In the block indicating step 318 and on the corresponding lines of the pseudo code (2) below an asterisk indicates that this stet is not used if the alternative queue length calculation is used. Step 318, or step 316 in the alternative case, is followed by return to the wait state according to arrow 320.

Figure 4A:
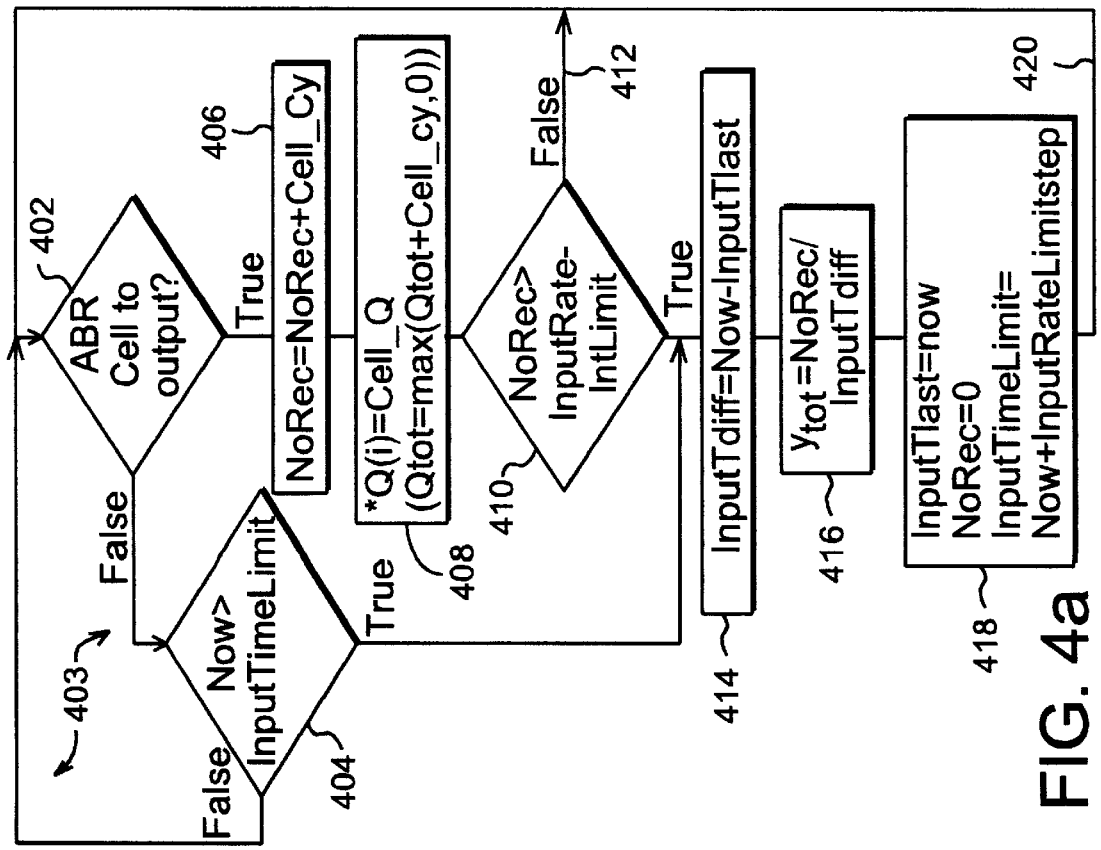

Code block (c2) below includes the state and operations shown in blocks 312, 316 and 313, the fields in question of the internal cell format being denominated "Cell_Cy_field" and "Cell_Q_field":

If Cell due for transmission to output port
   Çell_Cy_field:=Cyi
   (c2) Cell_Q_field:=Qi
   Çyi:=0
   Qi:=Qi−1
EndIf The flow diagram of FIG. 4a illustrates steps for calculating aggregated offered rate $y_{tot}$ and queue length at the output device 224. Waiting for transmission of ABR cells to output link is represented by a start step 402 and a return loop 403 containing an alternative start step 404.

If an ABR cell shall be transmitted, steps 406 and 408 follow in which the contents $Cy_i$ and $Q_i$ of the arrival cell count and queue length fields 228 of the internal format are read and added to produce a total arrival rate count and a total queue length count Qtot, respectively. In the step 408 block and in code block (c3) below a queue length calculation expression following on an asterisk * indicates that this calculation is not used in case the alternative method to calculate the total queue length is used.

The counter values obtained via the Cy field in the internal cell format indicate the number of cells that have arrived to the switch input port containing the input buffer 204 (said input port being logically connected to the switch output port via the output device 224) since the last cell departure. The counter value will be able to be zero if there are cells stored in the buffer 204 and no cells arrive to it. The same procedure is performed at all switch input ports so that the cells arriving to the input device 224 will bring with it the number of cells arriving between two arrivals to the respective logical input buffer. If these counter values are now summed the total number of cells arriving to a certain output port via a number of inputs will be obtained. If this value is divided with the time during which the counting is performed, there will be a total rate measure.

If, on the contrary, the number of arrivals is summed continuously and simultaneously this sum is decreased by 1 (Qtot) for each ABR cell that passes and delivers a Cy value, a net of the number of cells existing in the system for the time being will be received, i.e. the queue length. If the Cy values arriving are zero the sum will thus continuously decrease. As a matter of fact this is exactly the operation which would have been done for obtaining the queue length if there had been only one great output buffer, but in this case the counter values must be transferred to the output, which means a certain delay between the queue length calculation thus obtained and the contents of the input buffer queues at a certain arbitrary point in time.

The alternative way of counting the queue length is based upon the above considerations. If the alternative method is used, a queue counter at the input and registers used at the output for summing the individual queue lengths are not needed.

According to the alternative method the total queue length may be calculated at the output device purely based on the cell arrival count. More particularly, in the output device 224 a total queue length Qtot is calculated by summing the arrival cell counts $Cy_i$, counted in the input device 206 and conveyed to the output device 224 in the internal cell format 228 as described earlier, and subtracting therefrom the amount of 1 for each cell belonging to the controlled ABR cell flow, that is sent further on the output link to the destination in the step 408 block and in code block (c3) below this alternative calculation is expressed as [Qtot=max((Qtot+Cell_Cy)−1,0)] where the decrementation −1 represents the cell arriving with the cell arrival count Cy, and 0 excludes negative Q values. The whole alternative expression is placed within brackets in order to indicate its character of alternative.

The alternative method implies that no separation between the values arriving from different input devices is necessary. Moreover, only one value has to be conveyed in the internal cell format. The alternative method could introduce some problems with synchronization between the actual number of stored cells and the measure Q in case of cells lost internally in the switch. However, this eventuality should be extremely exceptional if the switch is properly designed.

Step 410 determines when a predetermined number Input RateLimit of cells are received. If this is not the case, return to the start step 402 follows according to step 412.

Step 404 in the return loop 403 establishes whether cells have not been received for a determined time period InputTtimelimit. This step is for obtaining a new value of $y_{tot}$ in case cells should not arrive during a prolonged period of time. If any of the two conditions according to the respective steps 404 and 410 are fulfilled, step 414 follows, in which a time frame InputTdiff is calculated since last this step was operating. This time frame is used in step 436 following next, in which $y_{tot}$ is calculated as the ratio between the total count of received cells and this time frame.

In the last step 418 the start time of a new time frame is set as the ending time of the preceding time frame, the count of received cells is set to zero, and a new starting point of time of the determined time period InputTimelimit is set. Return to the start step 402 then follows according to arrow 420.

Code block (c3) below defines the operations of the flow diagram of FIG. 4a.

As stated earlier and follows from the above, $y_{tot}(t)$ is measured by taking ratio of cell count and time interval, expressed below as "NoRec/InputTdiff" where the time interval "InputTdiff" is determined by "Now-InputTlast".

```
If ABRCell due for transmission on link
    NoRec:=NoRec+Cell_Cy_field
    Q(i):=Cell_Q_field
    [Qtot=max((Qtot+Cell_Cy)−1,0)]
    If NoRec>=InputRateIntLimit
        inputTdiff:=Now-InputTlast
        ytot:=NoRec/InputTdiff
        InputTlast:=Now
        (c3) InputTimeLimit:=Now+inputRateLimitstep
        NoRec:=0
    EndIf
ElseIf (Now>InputTimeLimit)
    InputTdiff:=Now-InputTlast
    ytot:=NoRec/InputTdiff
    InputTlast:=Now
    InputTimeLimit:=Now+InputRateLimitstep
    NoRec:=0
Endif
```

The flow diagram of FIG. 4b illustrates operations in connection with calculation of bandwidth capacity available for ABR cells, i.e. available rate C(t), in the output device 224.

Waiting for the appearance of high priority HP cells heading for our-put is represented by a starrt step 422 and a return loop 424 containing an alternative start step 426. If an HP cell is received in step 422 an HP cell counting step 426 follows. The next step 430 establishes if more than a predetermined number OutputRateIntLimit of HP cells are received. If not, return to start step 422 follows according to arrow 432.

Step 426 in the return loop 424 establishes whether HP cells have not been received for a determined time period HPtimelimit. This step is for obtaining a new value of C in case HP cells should not arrive during a long period of time. If any of the two conditions according to the respective steps 426 and 430 are fulfilled, step 434 follows, in which a time frame outputTdiff is calculated since last this step was operating. This time frame is used in step) 436 following next, in which the available rate (t) is calculated.

As stated earlier, the available rate C(t) is measured by taking the difference between the total link rate and bandwidth allocated by traffic with higher priority. This is expressed in the block 436 and in the following code block (c4) as "C:=LinkRate−StaticAlloc−NoSentHP/OutputTdiff". "LinkRate" is a configuration parameter that is provided by the management system for the network and states the type of rate provided by the layer below ATM. The meaning of "NoSentHP" and "StaticAlloc" has been explained earlier.

In the last step 438 the start time of a new time frame OutputTdiff is set as the ending time of the preceding time frame, the count of received cells in step 428 is set to zero, and a new starting point of time of the determined time period Hptimelimit is set. Return to the start step 422 then follows according to arrow 440.

Code block (c4) below includes the states and operations shown in FIG. 4b.

```
If HPCell sent on output link
    NoSentHP:=NoSentHP+1
    If NoSentHP>=OutputRateIntLimit
    (c4) OutputTdiff:=Now-OutputTlast
        C:=LinkRate−StaticAlloc−NoSentHP/OutputTdiff
        OutputTlast:=Now
        HPtimelimit:=Now+HPlimitstep
        NoSent:=0
    EndIf
ElseIf (Now>HPtimelimit)
    OutputTdiff:=Now-OutputTlast
    C:=LinkRate−StaticAlloc−NoSentHP/OutputTdiff
    OutputTlast:=Now
    HPtimelimit:=Now+HPlimitstep
    NoSent:=0
EndIf
```

Figure 4C:
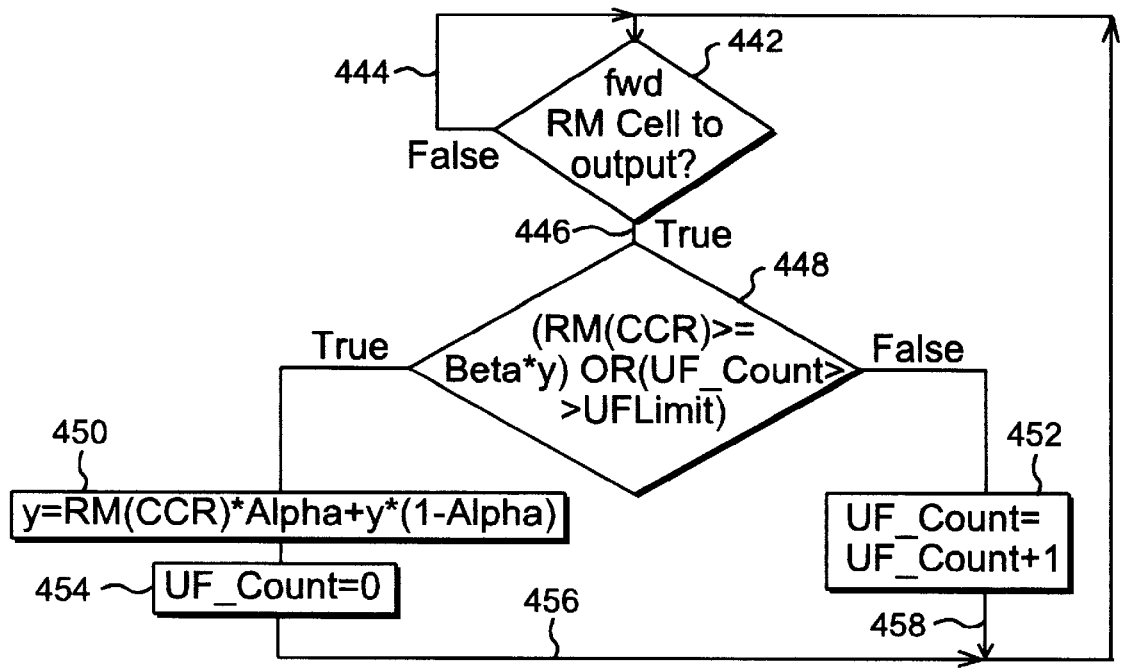

The flow diagram of FIG. 4c illustrates operations in connection with calculation of fair share rate y in the output device 224.

Waiting for RM cell heading for output is represented by block 442 and continue wait state arrow 444. If an RM cell is due for output, indicated by arrow 446, step 448 establishes whether anyone of two conditions is fulfilled. The first one of these conditions is that CCRs have a value equal or higher than $\beta y(t)$, expressed as "RM(CCR)>=(Beta*y) OR (UF_Count>UFlimit)", and the second condition is that a count, expressed as "UF_Count", of the number of received underflowing CCR values exceeds a limit expressed as "UFlimit". If any of the two conditions is fulfilled step 450 follows, otherwise step 452.

In step 450 the operation expressed by formula (2) above is performed, this being expressed in pseudo code in FIG. 4c and in code block (c5) below as "y:=RM(CCR)*Alpha+y*(1−Alpha)". This is followed by step 454 in which UF_count is set to zero, and return to the wait state 442, 444 as indicated by arrow 456.

In step 452 the operation expressed in pseudo code in code block (c5) below as "UF_count:=UF_Count+1" is performed, followed by return to the wait state 442, 444 according to arrow 458.

Code block (c5) below includes the states and operations shown in FIG. 4c.

```
If Forward RM cell due for transmission on the output link
    If RM(CCR)>=(Beta*y) OR (UF_Count>UFlimit)
        y:=RM(CCR)*Alpha+y*(1−Alpha)
    (c5), UF_Count:=0
    Else
        UF_Count:=UF_Count+1
    EndIf
EndIf
```

Figure 4D:
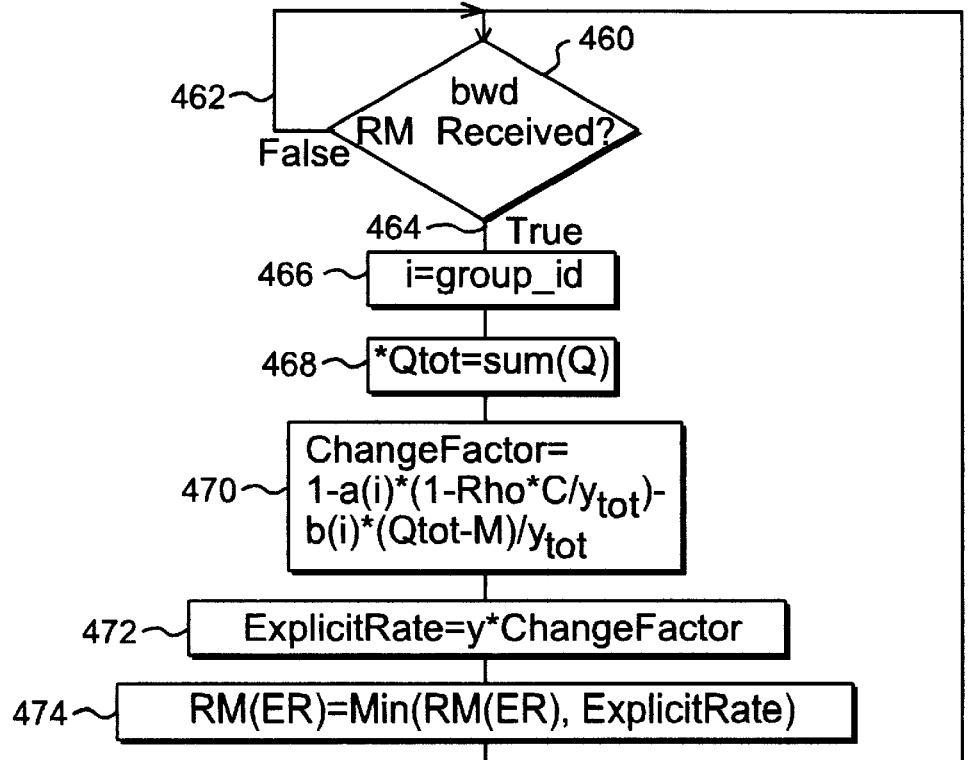

FIG. 4d is a flow diagram illustrating the steps for explicit rate calculation. Waiting for arrival of RM cells is represented by a block 460 and continue wait state arrow 462. If an RM cell is received, indicated by arrow 464, determination of group $G_i$ identity is made in step 466 for enabling choice of relevant constants $a_i$ and $b_i$. Thereupon summation of all received queue values in step 468 follows if not the alternative queue length calculation is to be used, cf. the asterisk * in the step 468 block and in the pseudo code (c6) below.

In steps 470 and 472 operations for calculating explicit rate $x_i(t)$ according to formula (1) in the output device 24 follow. In step 470 a change factor for the contention rate y(t) is calculated, and in step 472 the explicit rate value is calculated by multiplying the change factor with the current contention rate y(t).

In step 474 the calculated explicit rate value is assigned to the ER field of a backward RM cell arriving to the switch, unless a lower ER value already was assigned to this ER field. This is expressed by the expression Min(RM(ER), ExplicitRate) included in the step 474 block. Steo 474 is followed by return to wait state 460, 462 according to arrow 476.

The pseudo code (c6) below relates to the steps of FIG. 4d.

```
If Backward RM cell received
    i:=Group id for connection
    (c6) *Qtot:=Sum(Q)
    ChangeFactor:=1-a(i)*(1-Rho*C/ytot)-b(i)*Qtot-M/
        ytot
    ExplicitRate:=y*ChangeFactor
    RM (ER):=Min(RM(ER),ExplicitRate)
EndIf
```

FIG. 5 shows a more detailed block diagram over the input device $206_i$ in FIG. 2. Cells arriving from the source, not shown, enter, according to the arrow 202 (FIG. 2), a function 502 performing ATM cell header operations. The function 502 contains basic ATM functions such as VPI/VCI (Virtual Path Identifier/Virtual Channel Identifier) translation, PTI (Payload Type Indicator) operations, adding switch internal cell format. Blocks 504 and 506 represent a cell arrival counter and queue length counter, respectively, to be controlled by the ATM cell header operations function 502, indicated by arrows 508 and 510, respectively.

Referring to the flow diagram of FIG. 3a, the function 502 takes care of the wait state according to steps 302, 303, and the counters 504 and 506 perform the operations of steps 306 and 308. As has been indicated earlier, the step 308 is not used if the alternative queue length calculation is used and therefore the counter 506 is superfluous in this case.

The cell arrival counter 504 consists of N separate counter registers, one for each of the N output ports of the switch 212. For every arrived ABR cell a corresponding one of these counter registers is incremented according to step 306 and as expressed in line 2 of code block (c1) to produce the arriving cell count $Cy_i$. At transmission of the ABR cell the register is reset to zero as part of step 316 and as expressed by line 3 of code block (c2) above.

The queue length counter 506, if used, comprises N separate counter registers, one for each of the N output ports of the switch 212. For every arrived ABR cell a corresponding one of these counter registers is incremented according to step 308 and as expressed in line 3 of code block (c1) to produce the queuing cell count $Q_i$. At transmission of the ABR cell the register is decremented as part of step 318 and expressed in line 4 of code block (c2).

A buffer memory 512 receives, arrow 514, the cells from the function 502 and stores these cells logically per output port to avoid head of line blocking. Higher priority will be given to cells from CBR and VBR connections, e.g. by implementing a head of line priority scheme.

A cell scheduler 516 is connected to the counters 504 and 506 for mutual control, as indicated by double arrows 518 and 520, respectively. The cell scheduler 516 retrieves, indicated by arrow 552, cells from the buffer memory 512 in such a way that there will always be a cell (CBR, VBR or ABR) in each cell time slot sent to the output port, originating from one of the logical input buffers. The only condition where this is not the case occurs if all output buffers are blocked simultaneously, i.e. the internal flow control stops the flow from all input devices. If a cell slot is allowed for transmission of an ABR cell to output port i, and in case of the alternative queue length calculation not being used, the current values $Cy_i$ and $Q_i$ of the cell arrival counter 504 register i and queue length counter 506 register i, respectively, are assigned to the respective fields of the internal cell format according to steps 316 and 318 in FIG. 3b. Upon each assignment the cell scheduler 516 resets the cell arrival counter 504 register i to zero and decrements the queue length counter 506 register i as part of these steps and described above. If the alternative queue length calculation is used, there is no queue length counter, and therefore the steps associated therewith are omitted.

A switch port 524 receives, arrow 526, cells from the cell scheduler 516 and handles the transmission of every cell (CBR, VBR, ABR) into the switch core according to arrow 216 (FIG. 2).

FIG. 6 is a block diagram illustrating the output device 224 and the function 230 of FIG. 2 in more detail. The cell flows 222 and 226, cf. FIG. 2, are included in FIG. 6.

Reading of the cell count $Cy_i$ and queue length $Q_i$, the latter in case the alternative method of calculating queue length is not used, in the arriving internal format fields 228 (FIG. 2) is indicated by a block 602 and arrows 604 and 606, respectively. The read $Cy_i$ values are added according to step 406 in FIG. 4a and to line 2 in code block (c3) in an adding function 608 to form a total arrival rate count. The read values $Q_i$ according to line 3 in code block (c3) are stored in queue length registers $610_{1-N}$.

In the adding function 608 an aggregate count according to step 406 in FIG. 4a of all ABR cell arrivals headed for an output port is stored. When a predetermined number of cells are received, as determined by step 410 and calculated according to line 5 in code block (c3), a rate measure in the form of a ratio is calculated by the function 608 according to steps 414 and 416, and lines 6 and 7 in code block (c3), i.e. $y_{tot}$ is calculated. Alternatively, exceeding a maximum time value triggs the calculation as signalled according to arrow 611 from a cell counter 612. The cell counter 612 counts, indicated by arrow 613, the cells arriving synchronously in the flow 222 in the form of CBR, VBR, ABR or unassigned cells, and is used as a clock function to keep track of the maximum time for calculating each input rate $y_{tot}$ by the function 608.

The available output rate C for ABR cells is calculated by a function 614. The function 614 counts, arrow 615, the number of sent higher priority cells NoSentHP by identifying cells belonging to a VBR connection, and is connected to the cell counter 612 to keep track of the time period HPtimelimit. The function 614 also has access to the value of static allocated bandwidth StaticAlloc for CBR traffic.

The queue length values $Q_i$ are stored in one each of the registers $601_{1-N}$ and a total count is summed up from their contents, according to first line of the step 408 block and line 3 of code block (c3).

If the alternative method of calculating queue length is used, then the queue length registers $601_{1-N}$ and reading and summing queue length values $Q_i$ will be replaced by a single register [610] connected, according to dashed line arrow 610', to the adding function 608 for receiving the total count according to step 406 therefrom. The single register [610] will be updated according to the second line of the steo 408 block and line 4 of code block (c3).

The contents of the CCR field of every RM cell passing through the output device 224 in the flow 222 are read, indicated by block 616 and arrow 617, by an averaging function 618. The determination according to seep 448 in FIG. 4c is performed. Provided that any of the conditions in this step is fulfilled, an exponential averaging of the CCR values is performed in step 450 followed by step 454 in the function 618 in accordance with formula (2) and as expressed in lines 3 and 4 in code block (c5). This averaging is used as an approximation of the fair share rate of the switch 212 (FIG. 2). If the conditions of step 448 are not fulfilled, step 452 replaces steps 450 and 454.

When an ER value is to be calculated, the count and the offered rate value of the function 608, the fair rate value of the averaging function 618, the available output rate C of the function 614, and Qtot are available, indicated by arrows 620, 622, 623 and 624, respectively, to an ER calculation function 626. As follows from the above Qtot is calculated either as the summed up contents of all registers $610_{1-N}$ or, in case the alternative method is used, the updated contents of a single register [610].

The ER calculation is performed for each arrival of a backward RM cell as determined by step 460 in FIG. 4d. However, consecutive calculation could be based on the same value if RM cells arrive close in time. Depending on the group $G_i$ of connections to which the RM cell belongs, as determined by step 466, a pair of proportional constants a and 'b are retrieved, double arrow 628, from a register 630.

The available rate C(t) is calculated according to step 436 preceded by steps 422–434 and ended by step 438 in FIG. 4b, cf. also code block c(4). The calculation of the explicit rate is performed according to steps 470 and 472 preceded by step 468 in FIG. 4d.

A block 632 and a double arrow 634 to the ER calculation function 626 indicates the reading and writing of backward RM cells according to steps 460 and 474, respectively. The block 632 may also include a function enabling insertion of new backward RM cells if required if the time interval between source originated RM cells becomes too long.

Figure 7:
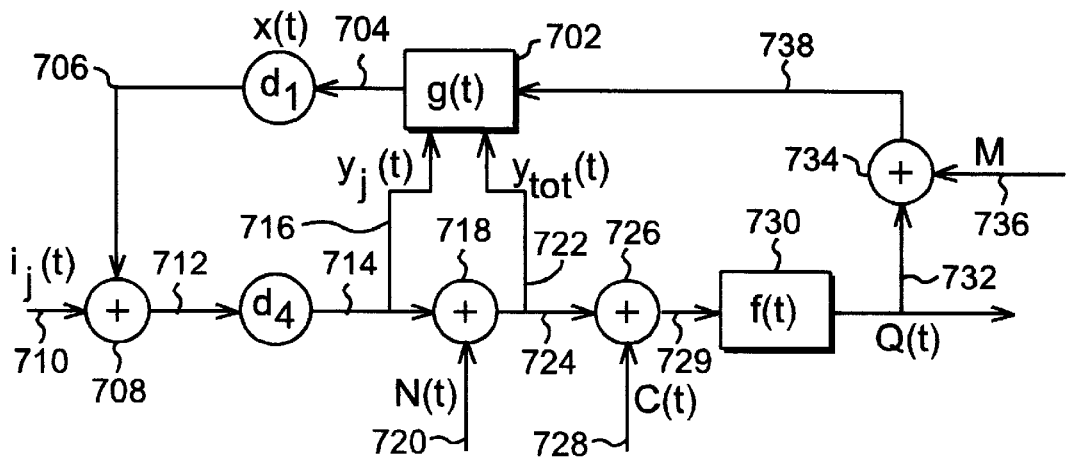
FIGS. 7 and 8 show fluid flow approximations of an algorithm used for describing a system according to the invention as illustrated by means of FIGS. 1–6.

The transient behaviour of a system of the kind described above with reference to FIGS. 1–6 together with the formulas (1) and (2) will now be discussed. For this purpose fluid flow approximations of the system according to FIGS. 7 and 8 will be used. In FIG. 7 the system is shown in a block diagram form in which input and output signals are approximated by continuous functions. Some of the signals and functions have been explained in the previous subsections.

With respect to the input rate, or rate of queue length actually, the control algorithm according to formula (1) is a proportional and integrating (PI) algorithm where a is the constant for the proportional term and b the constant for the integrating term. Consequently, the queue length will be controlled by one term with the queue derivative corresponding to the proportional term, and one proportional term (PD) corresponding to the integrating term with respect to the rate. Thus, depending on what is studied the control is either working as a PI or PD algorithm.

In FIG. 7 a block 702 represents an explicit rate value calculating function producing as an output, flow arrow 704, the explicit rate value x(t). The explicit rate value x(t) is sent back according to flow arrow 706 to the source end system. More particularly, the explicit rate value x(t) as affected by the propagation delay $d_1$ is superposed in an adding function 708 on a signal $i_jt$ received at the adding function 708 according to flow arrow 710. The result, according to flow arrow 712, of the superposition is affected by the propagation delay $d_4$ to form the signal $y_jt$, flow arrow 714.

The background of the signal $i_jt$ is as follows. Each control loop will return the rate value that the sources shall use when sending in order to cope with congestion, i.e. x(t) of formula (1). It can, however, be suitable to introduce, in a model, deviations from the ideal input signal that the source may perhaps provide by e.g. sending at a slower rate or not at all. This deviation is modelled by means of the signal i(t) in order to introduce generally in the model. Furthermore, during the starting phase of connection there is no control loop established since no RM cells have been returned yet. In that case the sources send with the so called initial rate ICR.

The signal yj(t) represents the input rate from connection j and is approximated, in the system, by an exponential averaging according to formula (2). In the previous description of the algorithm no discretion on the input rates were made, thus yj(t) corresponds to y(t) in (1).

The signal $y_jt$ forms an input to the function 702 according to arrow 716, and to an adding function 718 to meet a signal N(t) forming another input to the adding function 718 according to arrow 720. The signal N(t) models the traffic from other connections. If there are Nvc active connections then $$N(t) = \sum_{j=1}^{Nvc-1} y_j(t) \quad (3)$$

The output flow, indicated by arrow 724, from the adding function 718 is the signal $y_{tot}(t)$ that forms another input according to arrow 722 to the function 702, and an input according to an arrow 724 to a subtracting function 726. The bandwidth capacity or available rate C(t) is a further input according to arrow 728 to the subtracting function 726.

In a fluid flow model, the buffer occupancy or queue length Q(t) can be expressed as the positive side of an integration of the total input rate $y_{tot}(t)$ subtracted by the available rare C(t). The subtraction function 726 produces the difference $y_{tot}(t)-C(t)$ that forms an input according to arrow 729 to an integrating function 730 that performs the integration of this difference, i.e.

$$Q(t) = \max\{(y_{tot}(t)-C(t)dt,0\}+Q(t_0) \quad (4)$$

The output Q(t) from the function 730 forms an input according to arrow 732 to a subtracting function 734 that as a further input receives the queue length reference M according to arrow 736 and produces the difference Q(t)−M. This difference forms according to arrow 738 a further input to the function 702.

For positive queue values of the formula (4) the derivative of the queue length will be $$\frac{d}{dt}Q(t) = y_{tot}(t) - C(t) \quad (5)$$

In the analysis of the system, the number of active and contending connections, Nvc, is assumed to be constant during the transients and all connections are assumed to have the same delays in the loop. Furthermore, the input rates per connections are also assumed to be equal, leading to the following approximation:

$$y_{tot}(t) = Nvc \cdot y_j(t) \quad (6)$$

The explicit rate, x(t), cf. the formula (1), and the queue derivative can now be rewritten as $$x(t) = y_j(t) - a\left\{y_j(t) - \frac{pC(t)}{Nvc}\right\} - b\left\{\frac{Q(t)-M}{Nvc}\right\} \quad (7)$$

and $$\frac{1}{Nvc}\frac{d}{dt}Q(t) = y_j(t) - \frac{C(t)}{Nvc} \quad (8)$$

The control loop may now be closed according to FIG. 7.

In order to give an explicit expression of the queue length the Laplace transforms of the continuous functions have been utilized. The final expression for the queue length is given in equation $$Q(s) = \frac{Nvc * I(s)e^{(d-d_1)s} + \{1 + a(p-1) - e^{ds}\}C(s) + b_S^M}{se^{ds} - (1-a)s + b} \quad (9)$$

Figure 8:
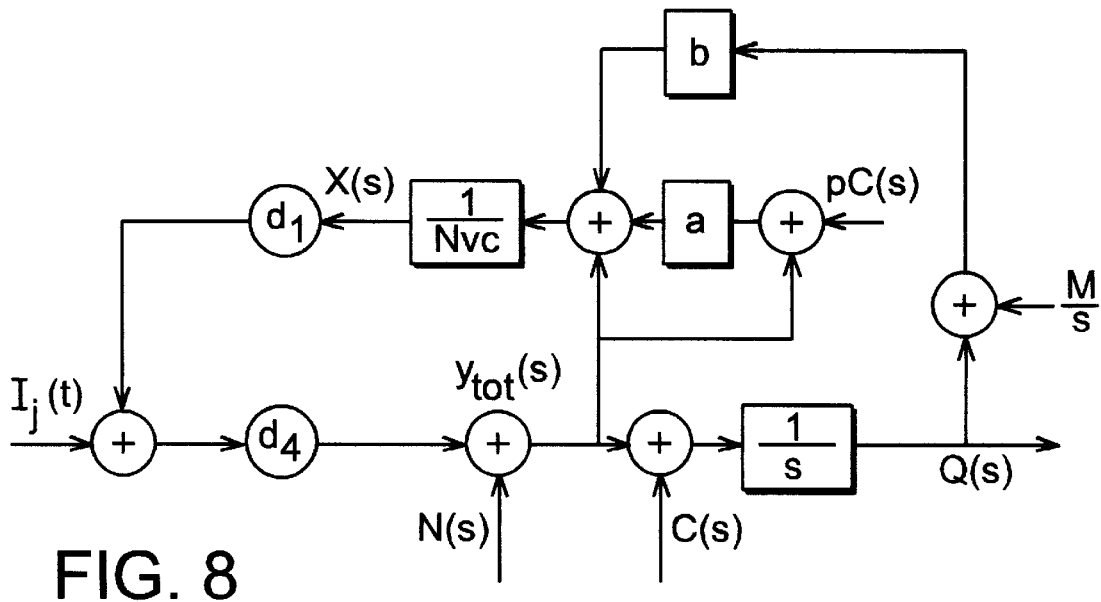

FIG. 8, gives the control loop in a block diagram form using the Laplace transformed signals.

The zeros of the denominator of equation (9) will be crucial for the system behaviour and a stability analysis has also been performed to set guidelines for the setting of the parameters a and b. Given a certain value a (should be in the range 0,1) it can be shown that the following limit is valid for the b value to attain a stable system.

$$b < \frac{\sqrt{1-(1-a)^2}}{d} * \operatorname{atan}\frac{\sqrt{1-(1-a)^2}}{(1-a)} \quad (10)$$

Note however that this is valid for a system with equal delays only. A variety of delays will cause different behaviour and the setting of the $a_i$ and $b_i$ parameters in such cases should be done with necessary margins and be supported by simulations.

The expression above reveals that b must be scaled with the delay in the loop.

Figure 9:
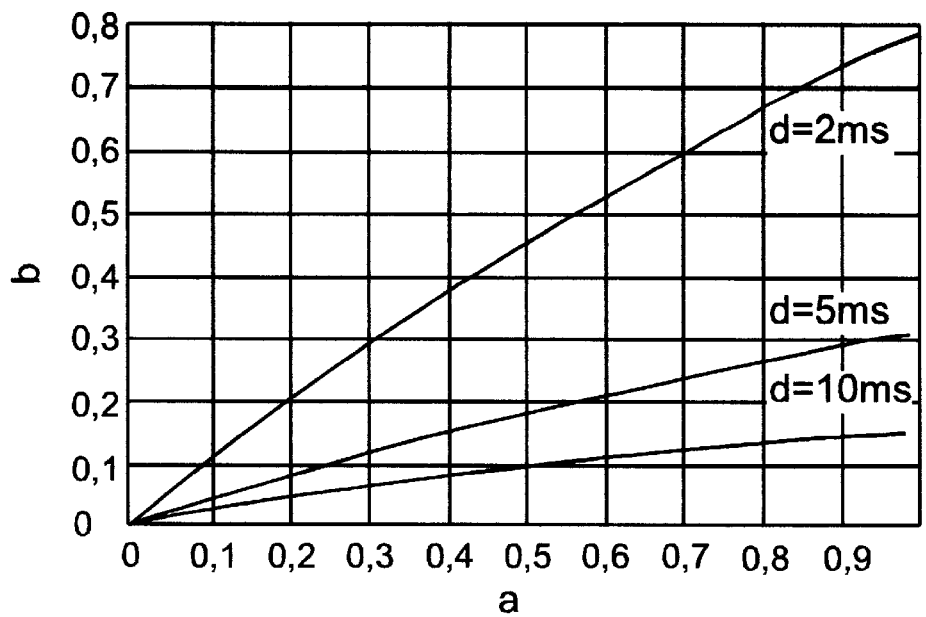
FIG. 9 is a curve diagram illustrating the behaviour of two constants used in the algorithm according to the invention, FIGS. 10a,b and 11a,b are curve diagrams illustrating the transient behaviour of the system according to the invention, FIGS. 12a,b are curve diagrams illustrating the transient behaviour of a system operating according to a prior art algorithm.

FIG. 9 is a diagram over the proportional constants a and b for different source-to-switch propagation delays d, the x-axis and y-axis showing a and b, respectively. An increase of the delay d leads to an inversely proportional descrease of 40 the constant b. Note that FIG. 9 shows the maximum values of b for each value of a that maintains an established control loop stable. However, when d is of the same order of magnitude as the time difference between two arrivals of RM backward cells, the accuracy of the linear model declines which results in a lower b value. Simulation shows that for a set to 0.8 values of b should be less than 1 to avoid oscillations.

Figure 10A:
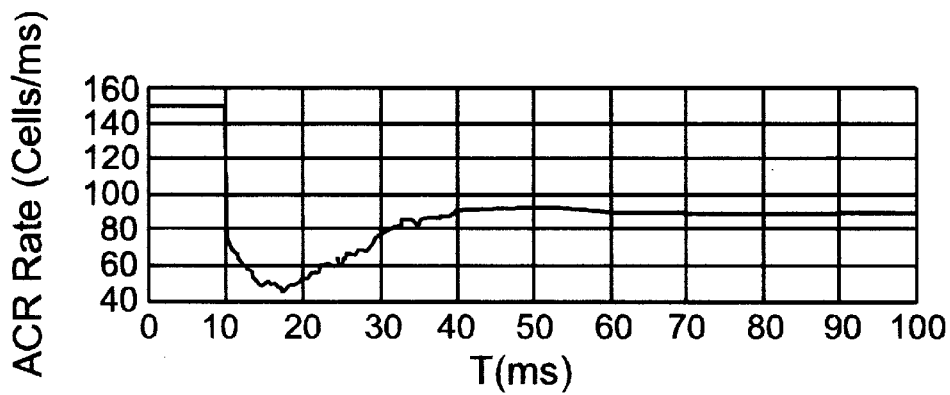
Figure 10B:
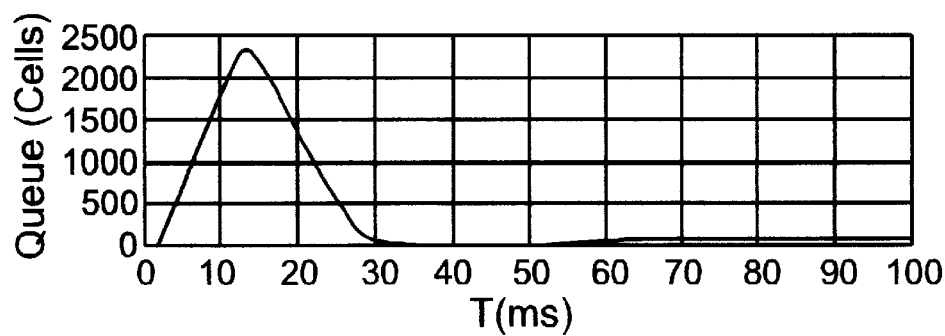
Figure 11A:
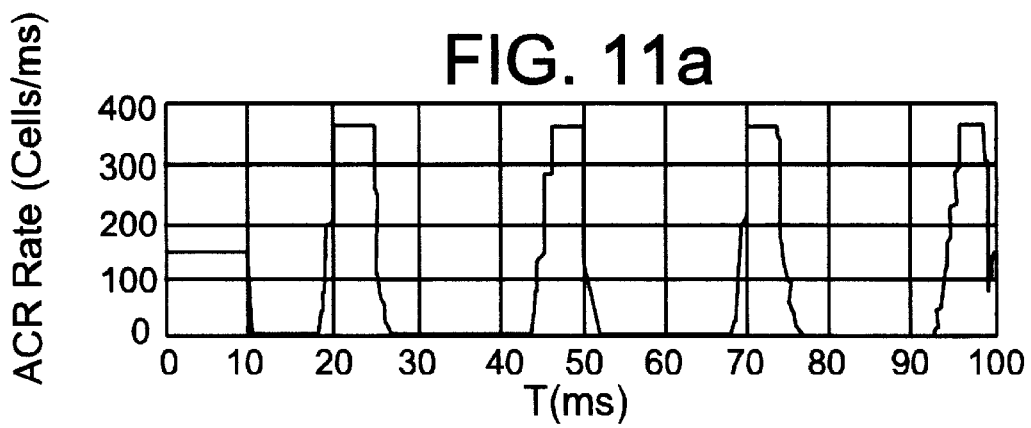
Figure 11B:
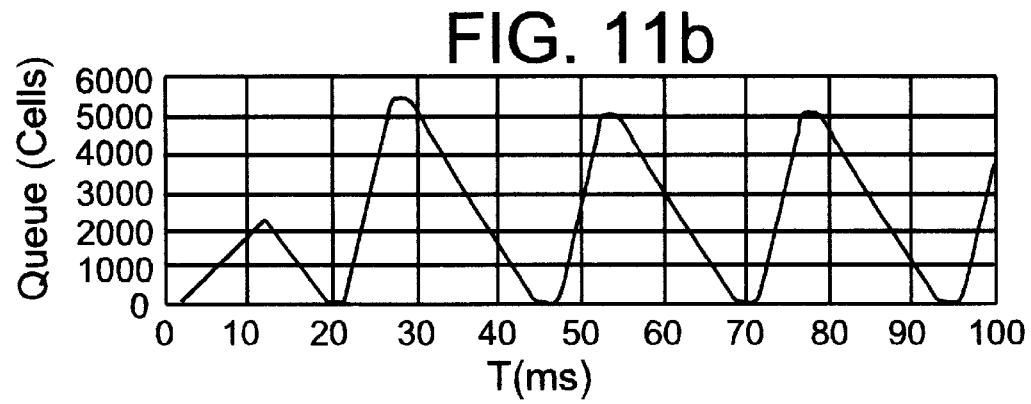

FIGS. 10a–b and 11a–b show curves obtained as a result of simulations of a case, in a structure of the kind described above with reference to FIGS. 2–6, where four sources are starting to transmit with an initial cell rate (ICR)=150 cells/ms (63.6 Mbps) each. FIGS. 10a and 11a on the y-axis show the allowed cell rate ACR in cells/ms. FIGS. 10b and 11b on the x-axis show time T in ms. in both simulations the source to switch propagation delay d was 5 ms and the rate proportional constant a was set to 0.8. In FIG. 10 the constant b is set to 0.1, which according to FIG. 9 is in a stable region for the control loop. As expected the transient does not exhibit any oscillations. The simulation curves in FIG. 11 have b=0.3 which gives an unstable control loop with undamped oscillations.

Figure 12A:
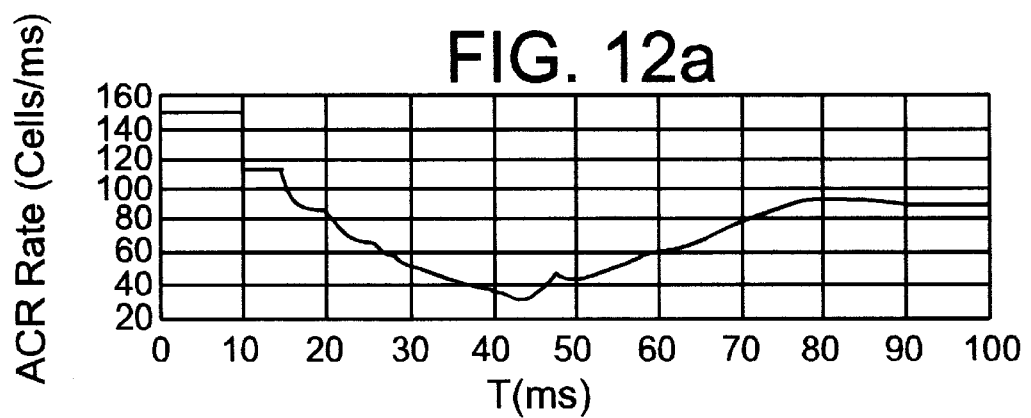
Figure 12B:
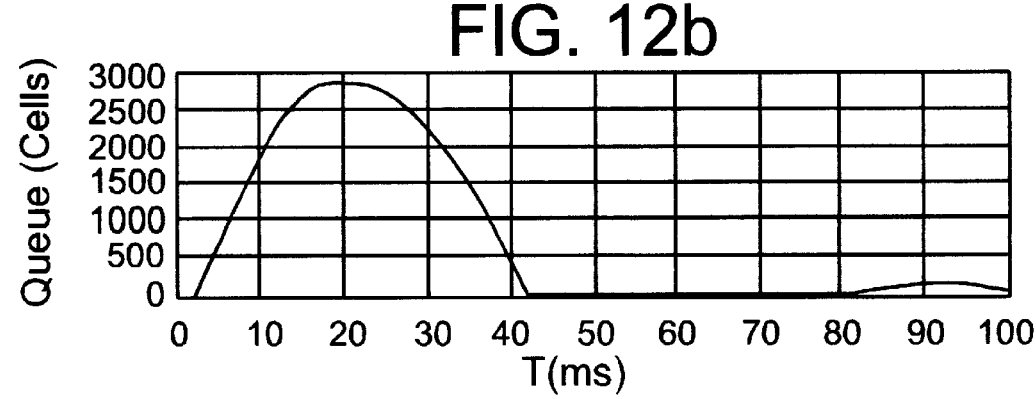

A comparative simulation of an algorithm disclosed in A. W. Barnhart, Hughes Network Systems, ATM Forum Contribution 95-0195, February 1995, "Example Switch Algorithm for Section 5.4 of TM Spec.", mentioned earlier, is presented in FIG. 12a and b which show curves in coordinate systems similar to those of FIG. 10a,11a and 10b,11b, respectively. The algorithm on which FIG. 12 is based gives a slower convergence towards the air share rate than the algorithm according to formula (1), but stays steady at the fair share when it is reached for the selected gain value (G=0.006). As indicated before, higher gain values cause undamped oscillation around the fair share rate.

The description thus far above presupposes FIFO scheduling only, but the algorithm may be modified to work in a fair queuing context as well.

In essence fair queuing, denominated FQ below, aims to provide equal sharing of the output resources of a switching device e.g. the output link bandwidth. Opposed to a FIFO scheduling scheme, traffic arriving to a FQ switch may be served earlier than traffic that arrived at an earlier point in time. A straight forward way to implement a FQ scheme is to have individual queues for each connection in the switch and serve these cyclically, giving each connection (session) a time slice of service each. In particular, for an ATM network such a time slice would be one cell i.e. one cell from each active ATM connection is sent in a cyclic manner, also referred to as "round robin scheduling". This type of mechanism avoids conditions where a bursty source allocates the entire output capacity for long time periods, which may happen in a FIFO case. For more details regarding FQ, reference is made to the reports stated below in which different alternative methods to accomplish fair queuing are described and analysed.

S. Golestani, "A Self-Clocked Fair Queueing Scheme for Broadband Applications", Globecom 1994.

K. Parekh, R. Gallager, "A generalized Processor Sharing Approach to Flow Control in integrated Services Network: The Single Node Case", IEE/ACM Transactions on Networking, Vol. 1, No 3, June 1993.

British patent application . . . , corresponding to EUA's document X95 5181, "Distributed Weighted Fair Queuing".

The main difference, as compared with a FIFO scheduling scheme, when using the invention in a fair queuing (FQ) switch is that it is possible to control the occupancy in the individual VC queues. Moreover, it is possible to derive the actual fair share rate of the switch by measuring the output rate of a connection. This is, however, only valid if there are cells in the queues, i.e. the load of the switch is 1. It is therefore important that the explicit rate value sent back to the source end system is related to the current fair share of the switch. Otherwise some connections will get larger portions of bandwidth than others, since round robin scheduling will not result in fair allocation of link capacity if there are not cells in all queues all the time.

By load is here and conventionally meant actual output rate from a system in relation to the maximal output rate of the system, i.e. If cells are sent in to the system with a rate equal to or higher than that of the output link, the load will be 1 (or 100%). In the fair queuing case, to be described more closely below, it is not the question of considering the total input rate (ytot) to the system and relating this to the link rate in, "change factor" as in the FIFC case. Using traffic theoretical terms, carried traffic is considered in the fair queuing case, and offered traffic is considered in the FIFO case (the concept traffic is measured in Erlang and is essentially always used in switch contexts as a measure of capacity).

With some minor modifications, the same model of the control loop as for the FIFO case may be used in the FQ case also. The signal N(t) is set to zero, because no other connections are using the queue. The effect of the other active connections are instead observed in the available rate which will vary linearly with the number of active connections. The resulting output capacity for each connection will be affected by the number of other active ABR connections (FQ operates on each connection) plus of course VBR and CBR influence.

As just mentioned, offered traffic is no longer used as part of the change factor, but now carried traffic or, in other words, the load on the system is used.

In the version of the invention relating to the FQ switch the explicit rate is calculated according to $$x(t) = \max(r_j(t)) \left[ 1 - a\left\{1 - \frac{pref}{p(t)}\right\} - b\left\{\frac{Q_j(t) - M_j}{\max(r_j(t))}\right\} \right] \quad (11)$$

where $r_j(t)$ is the fair share or output rate for connection j, and p(t) is the total load on the output link calculated as the quotient: number of sent AER cells per time unit/the number of occasions to send an ABR cell per time unit. The load will thus be 1 if all occasions of allowance of sending a cell are used. Instead of measuring the input rate ytot as in the FQ case, the load on the buffer, p(t), is measured, which corresponds to the carried traffic. In the formula above this measure is related to a reference load pref, being the desired load on the system. When the load t(t) is lower than the reference load the term will contribute with a positive value to increase the load. The queue length will be measured on a per connection basis which is possible in a FQ environment. The max operation performed on the individual connection output rates rj(t) is done in order to find the common fair share rate of the switch and thus avoid a divergence in the individual connection rates. The reason for relating change factor to a value for all connections is that there is a risk that the connections strive towards different rates, i.e that the change factor value moves towards 1 but the associated connections have landed on different rates. In other words, although the equation systems have several different solutions for steady state, the one in which all rates are equal is desirable here.

An embodiment of ER calculation for a FQ scheme where all operations take place at the input port will now be described with reference to FIGS. 13 and 14.

Figure 13:
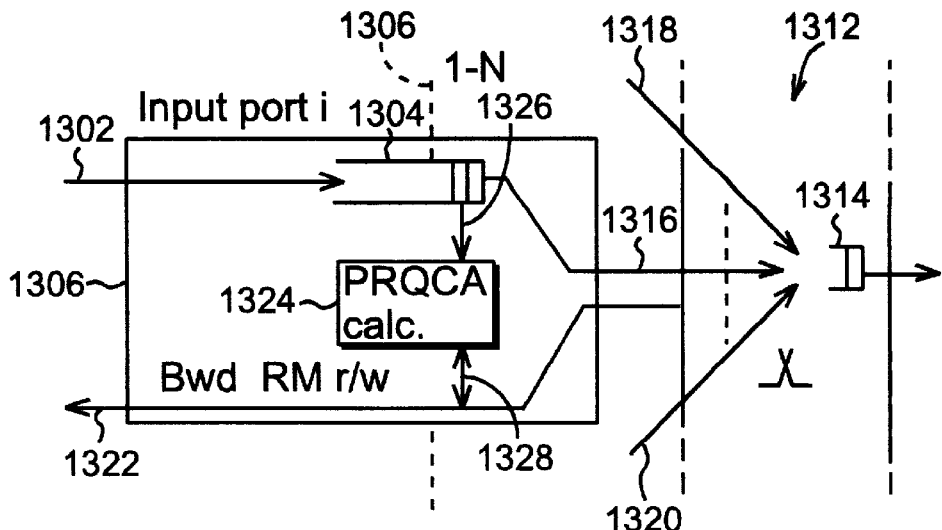
FIG. 13 is a view similar to the one in FIG. 2 illustrating a switch in a further embodiment of the invention, FIG. 14 in greater detail illustrates part of the switch of FIG. 13.

FIG. 13 is a schematic view, similar to FIG. 2, of the input port showing part of a two-way connection extending through a switch between a source and destination. In FIG. 13 an arrow 1302 indicates cells arriving from the source, not shown, at a logical input buffer 1304 of the input port, designated 1306$_i$. The input port 1306$_i$ is a member of a number of input ports 1306$_{1-N}$ belonging to the switch, indicated at 1312. All of these input ports include logical input buffers, such as the buffer 1304. At each input port the number of queuing cells are counted to produce a queuing cell count $Q_i$. Cells leaving the buffer 1304 and entering an output buffer 1314 located in an output port, not shown, of the switch 1312 are indicated by an arrow 1316. The output port including the buffer 1314 is a member of N output ports belonging to the switch 1312. Arrows 1318 and 1320 indicate cell flows from the logical buffers of the other ones of the input ports 1306$_{1-N}$ also entering the same switch output buffer 1314.

Cells returned by the destination in the backward direction through the switch 1312 and the input port 1306 are indicated by an arrow 1322.

In the input port 1306 the actual explicit rate calculation and backward RM cell assignment takes place in a function indicated by a block 1324. An arrow 1326 pointing to the block 1324 indicates transfer of the $Q_i$ count. A double arrow 1328 between the arrow 1322 and the block 1324 indicates read and write operations on a backward RM cell.

Figure 14:
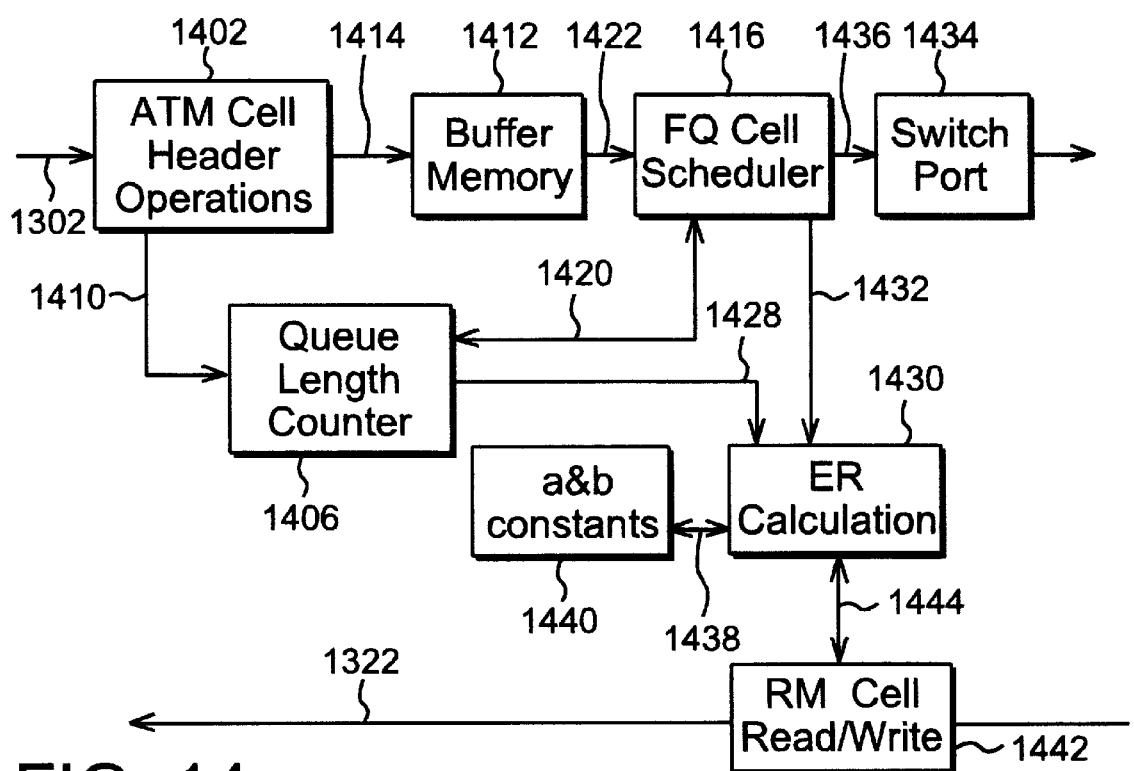

FIG. 14 shows a more detailed block diagram over the input port 1306$_i$ in FIG. 13. Cells arriving from the source, not shown, enter, according to the arrow 1302 (FIG. 13), a function 1402 performing ATM cell header operations. The function 1402 contains basic ATM functions such as VPI/VCI (Virtual Path Identifier/Virtual Channel Identifier) translation, PTI (Payload Type Indicator) operations, adding switch internal cell format. A block 1406 represents a queue length counter to be controlled by the ATM cell header operations function 1402, indicated by arrow 1410.

The queue length counter 1406 is incremented for every arrived ABR cell to produce the queuing cell count $Q_i$. At transmission of the ABR cell the register is decremented.

A buffer memory 1412 receives, arrow 1414, the cells from the function 1402 and stores these cells logically per output port to avoid head of line blocking. Higher priority will be given to cells from CBR and VBR connections, e.g. by implementing a head of line priority scheme.

A cell scheduler 1416 is connected to the counter 1406 for mutual control, as indicated by double arrow 1420. The cell scheduler 1416 retrieves, indicated by arrow 1452, cells from the buffer memory 1412 in such a way that there will always be a cell (CBR, VBR or ABR) in each cell time slot sent to the switch output port, originating from the logical input buffer 1304. The cell scheduler 1416 is coordinated with the corresponding cell schedulers of all inputs, implying that it can count the time T for each new "sweep" over the connections that the FQ algorithm does (one cell from each connection is sent out). 1/T then provides the fair share rate $r_j(t)$ that the system has at the moment towards a certain output. Furthermore the load p(t) on the output link 1316 is calculated as the quotient: number of sent ABR cells per time unit/the number of occasions to send an ABR cell per time unit, as has been mentioned earlier. This is done separately for each input buffer 1304, but if the FQ algorithm works as it should, this provides a measure of the total load on the output from the output buffer 1314.

When an ER value is to be calculated, the count on the queue length counter is available, indicated by arrow 1428, to an ER calculation function 1430. The values of the load p(t) and the fair share rate $r_j(t)$ are available, arrow 1432, on the FQ cell scheduler 1416.

The ER calculation is performed for each arrival of a backward RM cell 1322. A switch port 1434 receives, arrow 1436, cells from the cell scheduler 1416 and handles the transmission of every cell (CBR, VBR, ABR) into the switch core according to arrow 1316 (FIG. 13).

A pair of proportional constants a and b are retrieved, double arrow 1438, from a register 1440. A block 1442 and a double arrow 1444 to the ER calculation function 1430 indicates the reading and writing of backward RM cells. The block 1442 may also include a function enabling insertion of new backward RM cells if required, if the time interval between source originated RM cells becomes too long.

Also in the FQ case the algorithm can be applied to a system allowing the use of great output buffers, meaning that the coordination of cell schedulers can be dispensed with. In this case the counter values must be transferred to the output as for the FIFO case, which means a certain delay between the queue length calculation at the output and the contents of the input buffer queues at a certain arbitrary point of time.

What is claimed is:

1. A method in an ATM system for controlling flows of data cells and flow control management cells from a number of sources to a destination over connections passing a network element, while returning the flow control management cells from the destination via the network element to their respective sources, said network element being exposed to congestion due to contention between the connections, said contention necessitating queuing of the connections, said data cells including lower priority cells and higher priority cells, and said flow control management cells having an explicit rate field for an explicit rate value used to limit a source maximum allowed cell rate to a specific value, and a current cell rate field for receiving said specific value, comprising performing in the network element the steps of counting a predetermined number of higher priority cells due to be sent on an output link from the network element to the destination while keeping track of the time interval taken for performing the counting to produce a higher priority cell rate in the form of a ratio between the counted higher priority cells and the time interval, calculating an available rate value for lower priority cells as a difference between a total available link rate value and the higher priority cell rate, establishing a queue length reference forming a desirable queue length, calculating deviations from the available rate value and the queue length reference due to receiving varying amounts of cells on contending connections, calculating a modified explicit rate value as a function of these deviations, and introducing the modified explicit rate value into the explicit rate field of the backward flow control management cells.

2. The method according to claim 1, comprising performing in the network element further steps of counting cells arriving from the respective sources to produce source specific cell counts, counting the source specific cell counts to produce a determined total count of received cells while keeping track of the time interval taken for performing the counting to produce an offered rate value as a ratio between the determined total count value and a time interval, calculating a total queue length for all arriving cells, calculating the deviation from the available rate value as a difference between the available rate value and the offered rate value, calculating the deviation from the queue length reference as a difference between the total queue length and the queue length reference.

3. The method according to claim 2, comprising performing in the network element the further steps of keeping track of a first condition implying that received current cell rate field values are equal to or higher than a threshold value and a second condition implying that a limit number of received current cell rate field values lower than the threshold value has been exceeded, calculating, provided that any of these conditions is fulfilled, a contention rate as an exponential averaging of the current cell rate field values, performing the calculation of the explicit rate value while using the contention rate as a multiplication factor.

4. The method according to claim 2 or 3, comprising performing in the network element a further step of multiplying the deviations from the available rate value and the queue length value each by a proportional constant.

5. The method according to claim 4, comprising performing in the network element the further step of determining the values of respective constants of each pair of proportional constants a and b for each connection j as depending upon the propagation delay in a loop extending over the source and the network element.

6. The method according to claim 2, comprising performing in the network element the further step of decreasing the available rate value by means of a multiplication factor.

7. The method according to claim 2, comprising performing in the network element further steps of counting queuing cells arriving from the respective sources to produce source specific queuing cell counts, and calculating the total queue length by summing all source specific queuing cell counts.

8. The method according to claim 2, comprising performing in the network element further steps of counting cells arriving from the respective sources to produce source specific cell counts, calculating the total queue length by summing these counts and subtracting therefrom the amount of 1 for each cell that is sent on the output link.

9. The control system in an ATM system for controlling flows of data cells and flow control management cells from a number of sources to a destination over connections passing a network element, while returning the flow control management cells from the destination via the network element to their respective sources, said network element being exposed to congestion due to contention between the connections, said contention necessitating queuing of the connections, said data cells including lower priority cells and higher priority cells, and said flow control management cells having an explicit rate field for an explicit rate value used to limit a source maximum allowed cell rate to a specific value, and a current cell rate field for receiving said specific value, comprising means for counting a predetermined number of higher priority cells due to be sent on an output link from the network element to the destination while keeping track of the time interval taken for performing the counting to produce a higher priority cell rate in the form of a ratio between the counted higher priority cells and the time interval, and means for calculating an available rate value for lower priority cells as a difference between a total available link rate value and the higher priority cell rate, establishing a queue length reference forming a desirable queue length, calculating deviations from the available rate value and the queue length reference due to receiving varying amounts of cells on contending connections, calculating a modified explicit rate value as a function of these deviations, and introducing the modified explicit rate value into the explicit rate field of the backward flow control management cells.

10. The system according to claim 9, comprising means for counting cells arriving from the respective sources to produce source specific cell counts, means for counting the source specific cell counts to produce a determined total count of received cells while keeping track of the time interval taken for performing the counting to produce an offered rate value as a ratio between the determined total count value and a time interval, and means for calculating a total queue length for all arriving cells, calculating the deviation from the available rate value as a difference between the available rate value and the offered rate value, calculating the deviation from the queue length reference as a difference between the total queue length and the queue length reference.

11. The system according to claim 10, comprising means for keeping track of a first condition implying that received current cell rate field values are equal to or higher than a threshold value and a second condition implying that a limit number of received current cell rate field values lower than the threshold value has been exceeded, calculating, provided that any of these conditions is fulfilled, a contention rate as an exponential averaging of the current cell rate field values, performing the calculation of the explicit rate value while using the contention rate as a multiplication factor.

12. The system according to claim 9 or 10, comprising means for multiplying the deviations from the available rate value and the queue length value each by a proportional constant.

13. The system according to claim 12, comprising means for determining the values of respective constants of each pair of proportional constants a and b for each connection as depending upon the propagation delay in a loop extending over the source and the network element.

14. The system according to claim 10, comprising means for performing in the network element the further step of decreasing the available rate value by means of a multiplication factor.

15. The system according to claim 10, comprising means for counting queuing cells arriving from the respective sources to produce source specific queuing cell counts, and calculating the total queue length by summing all source specific queuing cell counts.

16. The system according to claim 10, comprising means for counting cells arriving from the respective sources to produce source specific cell counts, calculating the total queue length by summing these counts and subtracting therefrom the amount of 1 for each cell that is sent on the output link.

17. A method in an ATM system for controlling slows of data cells and flow control management cells from a number of sources to a destination over connections passing an output buffer of a switch, while returning the flow control management cells from the destination via the switch to their respective sources, said output buffer being exposed to congestion due to contention between the connections, said contention necessitating queuing of the connections, said data cells including lower priority cells and higher priority cells, and said flow control management cells having an explicit rate field for an explicit rate value used to limit a source maximum allowed cell rate to a specific value, and a current cell rate field for receiving said specific value, comprising performing the steps of obtaining values of a set of parameters and variables including $y(t)$: a contention rate at the output buffer at time t, $y_{tot}(t)$: a measured offered rate to the output buffer at time t, $C(t)$: available rate at the buffer for lower priority cells at time t, $Q(t)$: total queue length at the buffer at time t, p: fraction of an available rate at the buffer strived for, M: a buffer queue length reference, $a_i$ and $b_i$: proportional constants for a connection i passing the output buffer, determining the explicit rate value $x_i(t)$ at time t for the connection i as $x_i t = y(t)[1-a_i\{1-pC(t)/y_{tot}(t)\}-b_i\{Q(t)-M/y_{tot}(t)\}]$, where i is an integer, and assigning the explicit rate value $x_i t$ to the explicit rate field of a backward flow control management cell.

18. The method according to claim 17, comprising counting cells arriving from the respective sources to produce source specific cell counts, counting the source specific cell counts to produce a determined total count value of received cells while keeping track of the time interval taken for performing the counting to produce the offered rate value $y_{tot}(t)$ as a ratio between the determined total count value and the time interval.

19. The method according to claim 18, comprising keeping track of a first condition implying that received current cell rate field values are equal to or higher than a threshold value and a second condition implying that a limit number of received current cell rate field values lower than the threshold value has been exceeded, calculating, provided that any of these conditions is fulfilled, the contention rate (y(t)) as an exponential averaging of the current cell rate field values.

20. The method according to claim 19, comprising determining the values of the respective constants $a_i$ and $b_i$ as depending upon the propagation delay in a loop extending over the switch and the source from which the connection i starts.

21. The method according to claim 18, comprising counting queuing cells arriving from the respective sources to produce source specific queuing cell counts, and calculating the total queue length by summing all source specific queuing cell counts.

22. The method according to claim 18, comprising counting cells arriving from the respective sources to produce source specific cell counts, and calculating the total queue length by summing these counts and subtracting therefrom the amount of 1 for each cell that is sent on the output link.

23. A method in an ATM system for controlling flows of data cells and resource management cells from a number of sources to a destination over connections passing a respective input buffer and a common output buffer of a fair queuing switch, while returning the resource management cells as backward resource management cells from the destination via the switch to the respective sources, said switch being exposed to congestion due to contention between the connections, said contention necessitating queuing of the connections in the input buffers and the output buffer, said resource management cells having an explicit rate field for an explicit rate value used to limit a source maximum allowed cell rate to a specific value, comprising obtaining values of a set of parameters and variables including $r_j(t)$: output rate at time (t) at the input buffer for connection j, p(t): total load at time (t) on output from the input buffer calculated as the quotient number of ABR cells received at the input buffer per time unit/ number of occasions to send an ABR cell per time unit, pref: desired load on output from the input buffer, $Q_j(t)$: queue length at time (t) at the input buffer for connection j, $M_j$: queue length reference at the input buffer for connection j, a and b: proportional constants for connection j, determining the explicit rate value $x_j(t)$ at time t for the connection j as $$x_j(t) = \max(r_j(t))[1-a\{1-\text{pref}/p(t)\}-b\{Q_j(t)-M/\max(r_j(t))\}]$$

wherein $\max(r_j(t))$ is an operation performed on the individual connection output rates $r_j(t)$ of the switch in order to find a common output rate for the connections passing the common output buffer and thus avoid a divergence in the individual connection rates, and j is an integer, and assigning the explicit rate value $x_{jt}$ to the explicit rate field of a backward resource management cell passing the input buffer j.

24. The method according to claim 23, comprising determining the values of the constants a and b as depending upon the propagation delay in a loop extending over the source and the switch.

* * * * *